US011592931B2

(12) United States Patent
Kim et al.

(10) Patent No.: US 11,592,931 B2
(45) Date of Patent: Feb. 28, 2023

(54) DISPLAY PANEL

(71) Applicant: LG Display Co., Ltd., Seoul (KR)

(72) Inventors: HyunGon Kim, Gyeonggi-do (KR); DukKeun Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 263 days.

(21) Appl. No.: 16/711,235

(22) Filed: Dec. 11, 2019

(65) Prior Publication Data

US 2020/0210044 A1 Jul. 2, 2020

(30) Foreign Application Priority Data

Dec. 28, 2018 (KR) .................. 10-2018-0173130

(51) Int. Cl.
*G06F 3/041* (2006.01)
*G06F 3/03* (2006.01)
*G06F 3/044* (2006.01)

(52) U.S. Cl.
CPC ........ *G06F 3/04166* (2019.05); *G06F 3/0304* (2013.01); *G06F 3/044* (2013.01); *G06F 3/0412* (2013.01); *G06F 2203/04106* (2013.01)

(58) Field of Classification Search
None
See application file for complete search history.

(56) References Cited

U.S. PATENT DOCUMENTS 9,733,758 B2  8/2017 Sun et al.
2011/0109601 A1* 5/2011 Brown ................ G06F 3/042
                                          345/204
2015/0062471 A1* 3/2015 Sung .................. G09G 3/3696
                                          349/33

* cited by examiner

*Primary Examiner* — Andre L Matthews
(74) *Attorney, Agent, or Firm* — Seed IP Law Group LLP

(57) ABSTRACT

A display panel includes common electrodes in an active area and a first driving circuit on one side of the active area and a second driving circuit on the other side of the active area. First read-out lines are electrically connected to the common electrodes, respectively, and to the first driving circuit. Second read-out lines are electrically connected to the second driving circuit, and to the first read-out lines, respectively. An output signal of phototransistors may be detected using read-out lines connected to a common electrode serving as a touch sensor, such that touch sensing and photosensing can be performed using the shared read-out line. No disconnection areas are provided between the read-out lines driven by the different driving circuits, or the disconnection areas are distributed. Abnormalities in image quality due to the disconnection areas are prevented, and a sensing function using the shared read-out lines is provided.

19 Claims, 20 Drawing Sheets

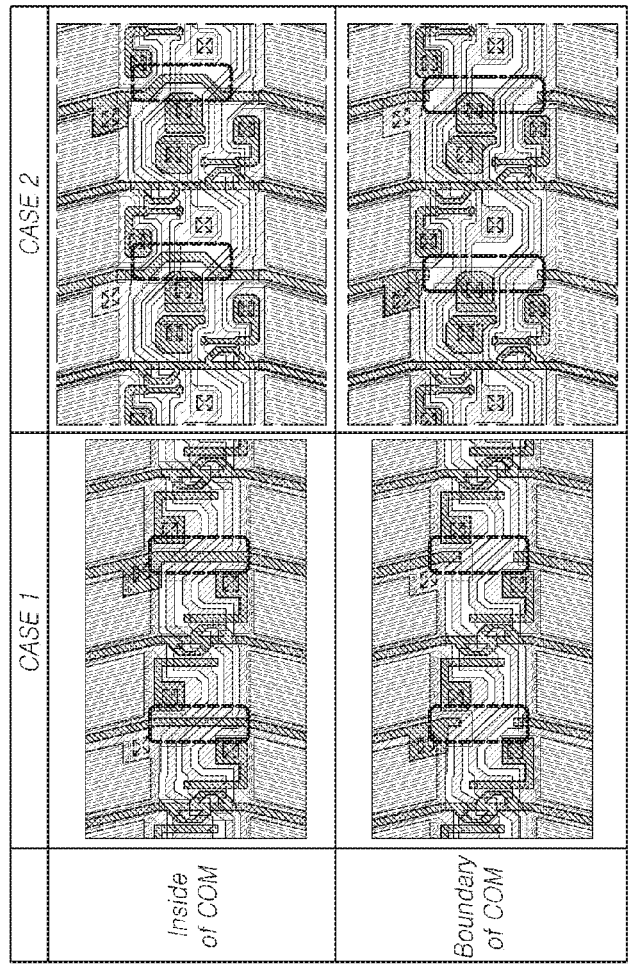
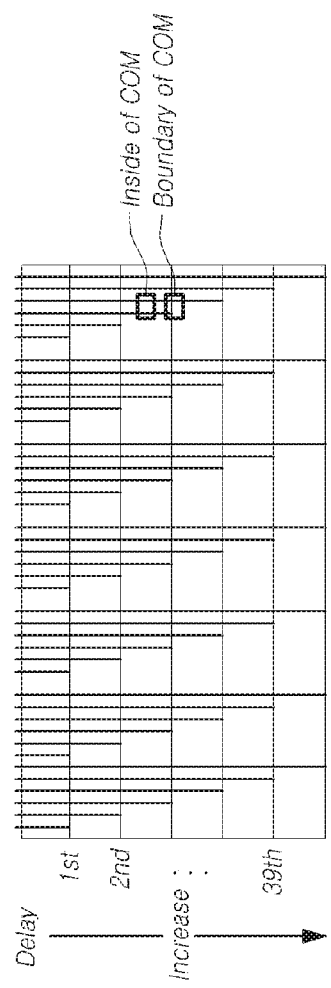
FIG. 13

<Boundary of COM>

DISPLAY PANEL

CROSS REFERENCE TO RELATED APPLICATION

This application claims priority to Korean Patent Application No. 10-2018-0173130, filed on Dec. 28, 2018, which is hereby incorporated by reference for all purposes as if fully set forth herein.

BACKGROUND

Technical Field

Exemplary embodiments relate to a display panel.

Description of Related Art

With the development of the information society, there has been an increasing demand for image display devices. In this regard, a range of display devices, such as liquid crystal display (LCD) devices and organic light-emitting diode (OLED) display devices, have recently come into widespread use.

Such display devices provide a function of detecting a user's touch or external light illumination on a display panel and performing an input process, on the basis of the detected touch or the like, in order to provide more various functions to users.

However, since a variety of components for display driving, such as electrodes and signal lines, are disposed in display panels, it is difficult to provide a function of detecting a touch or external light while maintaining the performance of the display panel.

BRIEF SUMMARY

Various aspects of the present disclosure provide a display panel able to efficiently realize a function of detecting a user's touch on the display panel and a function of detecting external incident light onto the display panel.

Also provided is a display panel able to reduce an increase in the ratio of non-open areas in an active area thereof while improving the ability to detect external light incident on the display panel.

Also provided is a display panel able to prevent degradations in image quality caused by the layout of read-out lines by suitably disposing the read-out lines for touch sensing and photosensing according to the type of the display panel.

According to an aspect, a display panel may include: a plurality of common electrodes disposed in an active area; at least one first driving circuit disposed on one side of the active area; at least one second driving circuit disposed on the other side of the active area; a plurality of first read-out lines electrically connected to the plurality of common electrodes, respectively, and to the first driving circuit; and a plurality of second read-out lines electrically connected to the second driving circuit, and to the plurality of first read-out lines, respectively.

Each first read-out line among the plurality of first read-out lines may be provided integrally with a corresponding second read-out line among the plurality of second read-out lines.

In the plurality of first read-out lines electrically connected to the plurality of second read-out lines, respectively, the first driving circuit may output a touch driving signal through one or more first read-out lines, among the plurality of first read-out lines, shorter than corresponding second read-out lines among the plurality of second read-out lines. The second driving circuit may output the touch driving signal through one or more second read-out lines, among the plurality of second read-out lines, shorter than corresponding first read-out lines among the plurality of first read-out lines.

The first driving circuit and the second driving circuit may simultaneously output the touch driving signal.

The display panel according to the present invention may further comprise a plurality of phototransistors. Two or more phototransistors among the plurality of phototransistors may be disposed in an area corresponding to one common electrode among the plurality of common electrodes. All of the phototransistors, disposed in the area corresponding the common electrode, may be electrically connected to a first read-out line among the plurality of first read-out lines and a second read-out line among the plurality of second read-out lines electrically connected to the common electrode.

At least one phototransistor of the phototransistors, disposed in the area corresponding to the common electrode, may be connected to the common electrode, thereby being electrically connected to the first read-out line and the second read-out line.

In at least a portion of a period during which a touch driving signal is applied to at least one common electrode among the plurality of common electrodes, a photo-control signal corresponding to the touch driving signal may be applied to a gate electrode of at least one phototransistor among the plurality of phototransistors.

The photo-control signal may have a phase and an amplitude the same as the phase and the amplitude of the touch driving signal. It may have a voltage level different from the voltage level of the touch driving signal. The phototransistor may be turned off by the voltage level of the photo-control signal.

According to another aspect, a display panel may include: a plurality of common electrodes disposed in an active area, and included in a first group or a second group; at least one first driving circuit disposed on one side of the active area; at least one second driving circuit disposed on the other side of the active area; a plurality of first read-out lines electrically connected to the common electrodes in the first group, respectively, and to the first driving circuit; and a plurality of second read-out lines disposed to correspond to the plurality of first read-out lines, respectively, each second read-out line among the plurality of second read-out lines being disconnected from a corresponding first read-out line among the plurality of first read-out lines, the plurality of second read-out lines being electrically connected to the plurality of common electrodes in the second group, respectively, and to the second driving circuit, wherein the plurality of common electrodes in the first group and the plurality of common electrodes in the second group are alternately disposed in a direction in which the first read-out lines and the second read-out lines extend.

Boundary area between the first read-out lines and the second read-out lines may be located on two or more straight lines intersecting the direction in which the first read-out lines and the second read-out lines extend.

One or more areas among a plurality of areas corresponding to the plurality of common electrodes, respectively, may have a polygonal shape, at least one internal angle of which is not a right angle.

Common electrodes, among the plurality of common electrodes, disposed in adjacent columns, may be disposed symmetrically with respect to each other.

At least one of the plurality of first read-out lines or the plurality of second read-out lines may overlap at least one signal line extending in a direction, intersecting the plurality of first read-out lines and the plurality of second read-out lines, in an internal area and a boundary area of a corresponding common electrode among the plurality of common electrodes.

A first read-out line among the plurality of first read-out lines and a second read-out line among the plurality of second read-out lines may overlap the at least one signal line in boundary areas of the first read-out line and the second read-out line in a pattern the same as a pattern in which the at least one of the plurality of first read-out lines or the plurality of second read-out lines overlaps the at least one signal line in the internal area of the common electrode.

According to another aspect, a display panel may include: a plurality of common electrodes disposed in an active area and included in a first group or a second group; at least one first driving circuit disposed on one side of the active area; at least one second driving circuit disposed on the other side of the active area; a plurality of first read-out lines electrically connected between each of the common electrodes in the first group and the first driving circuit; a plurality of second read-out lines disposed to correspond to the plurality of first read-out lines, respectively, electrically connected to the plurality of common electrodes in the second group, respectively, and electrically connected to the second driving circuit; and one or more dummy patterns disposed between one or more first read-out lines among the plurality of first read-out lines and corresponding one or more second read-out lines among the plurality of second read-out lines.

The dummy patterns may be separated from each other. Each of the dummy patterns may correspond to one common electrode among the plurality of common electrodes.

Each of the dummy patterns may be electrically connected to the corresponding common electrode.

According to exemplary embodiments, an output signal of the phototransistor disposed in the area corresponding to the common electrode can be detected through the read-out line electrically connected to the common electrode serving as the touch electrode in the display panel, so that the touch sensing and the photosensing can be performed without additional provision of wire lines in the display panel.

According to exemplary embodiments, the phototransistor disposed in the area corresponding to one common electrode is connected to the common electrode, and thus, is electrically connected to the read-out line. Accordingly, it is possible to electrically connect the phototransistor to the read-out line while minimizing an increase in the ratio of non-open areas.

According to exemplary embodiments, the disconnection areas between the read-out lines connected to the common electrodes are minimized, the disconnection areas are distributed, or the compensation patterns are provided in the disconnection areas, such that degradations in image quality due to the layout of the read-out lines can be prevented.

DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which:

FIGS. 13 and 14 illustrate structures of disconnection areas of read-out lines disposed in the display panel according to exemplary embodiments;

DETAILED DESCRIPTION

Figure 1:
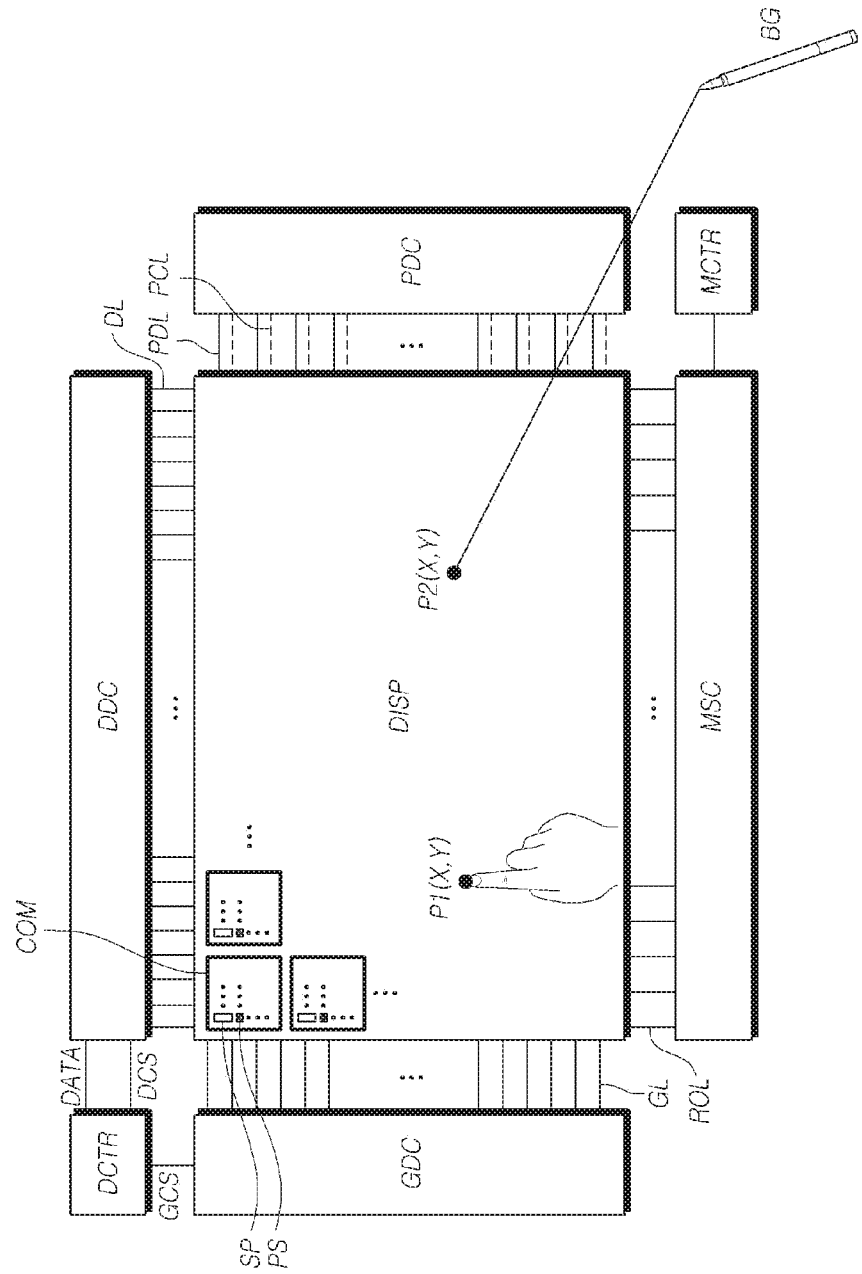
FIG. 1 illustrates a system configuration of a display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element.

Figure 2:
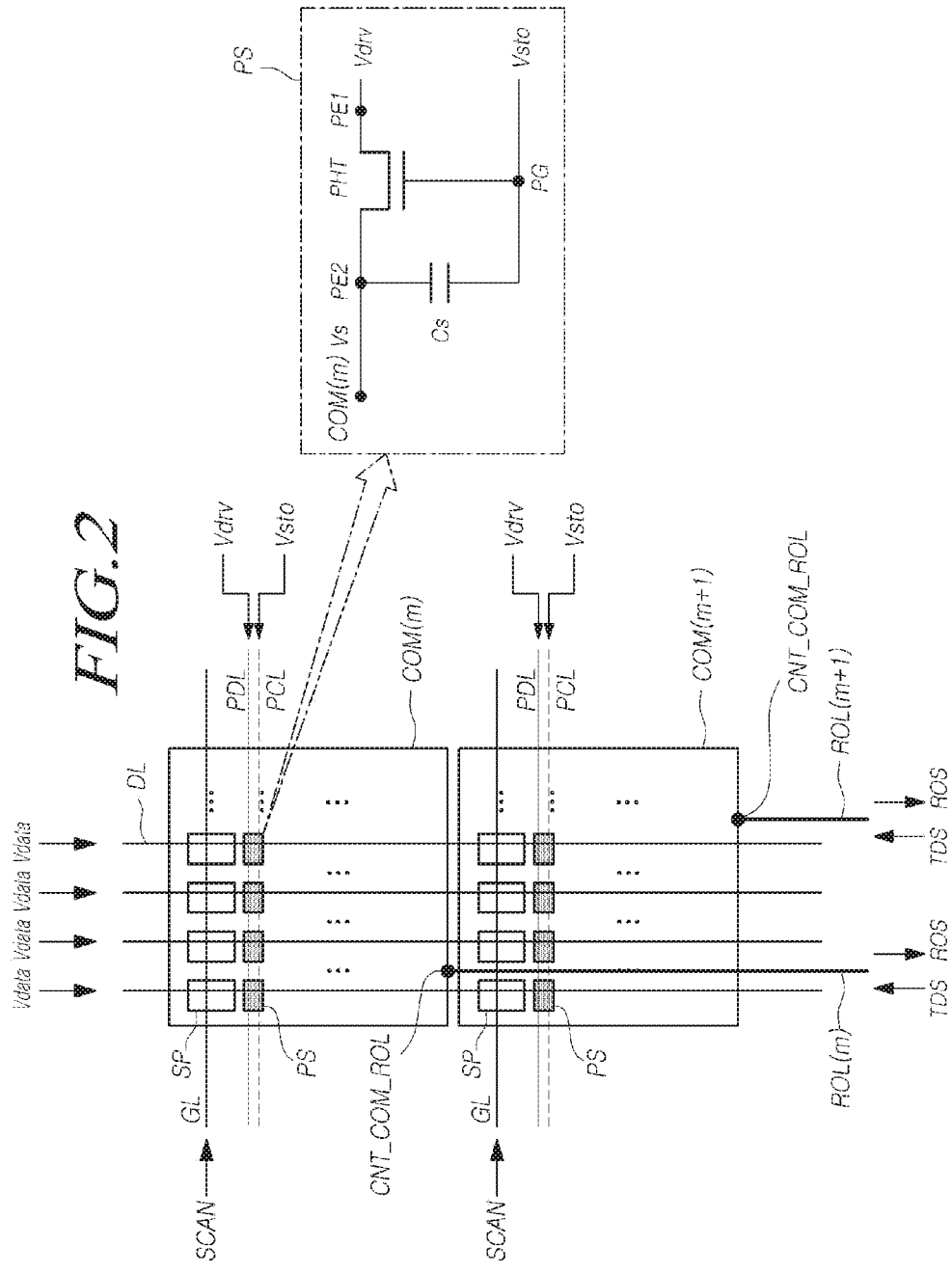
FIG. 2 illustrates a basic multi-sensor configuration of the display panel according to exemplary embodiments.

FIG. 1 illustrates a system configuration of a display device according to exemplary embodiments, and FIG. 2 illustrates a basic multi-sensor configuration of the display panel DISP according to exemplary embodiments.

Referring to FIG. 1, the display device according to exemplary embodiments may provide not only a basic display function, but also a multi-sensing function, including a touch sensing function, a photosensing function, and the like.

When a user touches a point P1(X,Y) on the display panel DISP using a finger, a pen, or the like in a contacting manner or in a non-contacting manner, the display device may detect the touch on the point P1(X,Y) using the touch sensing function and perform a process (e.g., input, selection, or execution of an application program) depending on the result of the sensing.

When the user illuminates a point P2(X,Y) on the display panel DISP with light using a beam generator BG, the display device may detect light illuminating the point P2(X, Y) using the photosensing function and perform a process (e.g., input, selection, or execution of an application program) depending on the result of the sensing.

The beam generator BG may be included in, for example, a laser pointer, a remote control, or the like. The beam generator BG may emit highly-collimated light. For example, the beam generator BG may emit a laser beam. Here, in an example, laser beams, or the like, emitted from the beam generator BG, may have a variety of wavelengths or a variety of colors.

The display device may include the display panel DISP, a data driving circuit DDC, a gate driving circuit GDC, a display controller DCTR, or the like.

The display device may include the display panel DISP, a photo-driving circuit PDC, a multi-sensing circuit MSC, a multi-controller MCTR, and the like, in order to provide the multi-sensing function, including the touch sensing function and the photosensing function.

Referring to FIG. 1, a plurality of data lines DL, a plurality of gate lines GL, and a plurality of subpixels SP may be disposed in the display panel DISP to provide the display function.

The plurality of data lines DL and the plurality of gate lines GL may be disposed in different directions to overlap or intersect each other. The plurality of data lines DL may be disposed in a column direction or in a row direction, while the plurality of gate lines GL may be disposed in a row direction or in a column direction. Hereinafter, the plurality of data lines DL will be described as being disposed in the column direction (i.e., a vertical direction), while the plurality of gate lines GL will be described as being disposed in the row direction (i.e., a horizontal direction).

Each of the plurality of subpixels SP may include a driving transistor and a pixel electrode. The driving transistor may be turned on by a scan signal SCAN, applied to a gate electrode thereof through a corresponding gate line GL among the plurality of gate lines GL, to apply a data signal Vdata, supplied thereto through a corresponding data line DL among the plurality of data lines DL, to the pixel electrode.

The display panel DISP may include a plurality of common electrodes COM, a plurality of read-out lines ROL, a plurality of photosensors PS, a plurality of photo-driving lines PDL, a plurality of photo-control lines PCL, and the like.

The touch sensing configuration of the display device may include the plurality of common electrodes COM serving as touch sensors. The touch sensing configuration may further include the read-out lines ROL electrically connected to the plurality of common electrodes COM, in addition to the plurality of common electrodes COM.

The display device may perform self-capacitance-based touch sensing or mutual-capacitance-based touch sensing. Hereinafter, the display device will be described as performing self-capacitance-based touch sensing, for the sake of brevity.

In addition, each of the common electrodes COM may be a plate-shaped electrode without an open area, a mesh-shaped electrode having open areas, or an electrode bent at one or more points.

The photosensing configuration of the display device may include the plurality of photosensors PS. Each of the plurality of photosensors PS may include a phototransistor PHT. In some cases, each of the plurality of photosensors PS may further include a photocapacitor Cs.

The photosensing configuration may further include the plurality of photo-driving lines PDL and the plurality of photo-control lines PCL, through which a photo-driving signal Vdrv and a photo-control signal Vsto are transferred to a plurality of phototransistors PHT, in addition to the plurality of photosensors PS. In some cases, the photosensing configuration may further include the common electrodes COM and the read-out lines ROL.

Each of the plurality of phototransistors PHT may include a gate electrode PG to which the photo-control signal Vsto is applied, a first electrode PE1 to which the photo-driving signal Vdrv is applied, a second electrode PE2 serving as a signal output node, and the like.

The photocapacitor Cs may be electrically connected between the second electrode PE2 and the gate electrode PG of the phototransistor PHT. The photocapacitor Cs may or may not be present in every photosensor PS.

The photo-control signal Vsto may be applied to the gate electrode of the phototransistor PHT through a corresponding photo-control line PCL among the plurality of photo-control lines PCL. The photo-driving signal Vdrv may be applied to the first electrode PE1 of the phototransistor PHT through a corresponding photo-driving line PDL among the plurality of photo-driving lines PDL. Each of the plurality of phototransistors PHT may output a signal Vs via the second electrode PE2, in response to illumination light.

Two or more phototransistors PHT may be present in each area of the plurality of common electrodes COM.

The second electrode PE2 of each of the two or more phototransistors PHT, disposed in each area of the plurality of common electrodes COM, may be electrically connected to the corresponding common electrode COM.

Thus, the signal Vs, output from each of the plurality of phototransistors PHT via the second electrode PE2 in response to illumination light, may be transferred to a corresponding read-out line ROL among the plurality of read-out lines ROL via the corresponding common electrode COM.

Components related to this multi-sensing function in the display panel DISP may be categorized with respect to the touch sensing function and the photosensing function. The plurality of phototransistors PHT, the plurality of photo-driving lines PDL, and the plurality of photo-control lines PCL are components only related to the photosensing function. In addition, fundamentally, the plurality of common electrodes COM and the plurality of read-out lines ROL are essential components for the photosensing function while being components related to the touch sensing function.

The display function and the multi-sensing function will be described with respect to the driving circuits.

First, the display driving circuits for providing the display function may include the data driving circuit DDC driving the plurality of data lines DL, the gate driving circuit GDC driving the plurality of gate lines GL, the display controller DCTR controlling the operations of the data driving circuit DDC and the gate driving circuit GDC, and the like. The multi-sensing circuit MSC driving the plurality of common electrodes COM may be further included.

The display controller DCTR controls the data driving circuit DDC and the gate driving circuit GDC by supplying a variety of control signals DCS and GCS to the data driving circuit DDC and gate driving circuit GDC.

The display controller DCTR starts scanning at points in time realized by respective frames, converts image data input from an external source into image data having a data signal format readable by the data driving circuit DDC, outputs the converted digital image data DATA, and controls data driving at appropriate points in time according to the scanning.

The gate driving circuit GDC sequentially supplies a gate signal having an on or off voltage to the plurality of gate lines GL, under the control of the display controller DCTR.

When a specific gate line GL is opened by the gate driving circuit GDC, the data driving circuit DDC converts image data, received from the display controller DCTR, into an analog image signal, and supplies a data signal Vdata, corresponding to the analog image signal, to the plurality of data lines DL.

The display controller DCTR may be a timing controller used in typical display technology, may be a control device including a timing controller and performing other control functions, or may be a control device different from the timing controller.

The display controller DCTR may be provided as a component separate from the data driving circuit DDC, or may be provided in combination with the data driving circuit DDC to form an integrated circuit (IC).

The data driving circuit DDC drives the plurality of data lines DL by supplying the data signal Vdata to the plurality of data lines DL. Herein, the data driving circuit DDC is also referred to as a "source driver."

The data driving circuit DDC may include one or more source driver ICs (SDICs). Each of the source driver ICs may include a shift register, a latch circuit, a digital-to-analog converter (DAC), an output buffer, and the like. In some cases, the source driver IC may further include an analog-to-digital converter (ADC).

Each of the source driver ICs may be connected to the display panel DISP by a tape-automated bonding (TAB) method, a chip-on-glass (COG) method, a chip-on-film (COF) method, or the like.

The gate driving circuit GDC sequentially drives the plurality of gate lines GL by sequentially supplying the scan signal SCAN to the plurality of gate lines GL. Herein, the gate driving circuit GDC is also referred to as a "scanning driver."

Here, the scan signal SCAN is comprised of an off-level gate voltage by which the corresponding gate line GL is closed and an on-level gate voltage by which the corresponding gate line GL is opened.

The gate driving circuit GDC may include one or more gate driver ICs (GDICs). Each of the gate driver ICs may include a shift register, a level shifter, and the like.

Each of the gate driver ICs may be connected to the display panel DISP by a chip-on-glass (COG) method, a chip-on-film (COF) method, or the like, or may be implemented using a gate-in-panel (GIP) structure disposed within display panel DISP.

The data driving circuit DDC may be disposed on one side of the display panel DISP (e.g., in an upper or lower portion of the display panel DISP), as illustrated in FIG. 1. In some cases, the data driving circuit DDC may be disposed in both sides of the display panel DISP (e.g., in upper and lower portions of the display panel DISP), depending on the driving system, the design of the display panel, or the like.

The gate driving circuit GDC may be disposed on one side of the display panel DISP (e.g., in a right or left portion of the display panel DISP), as illustrated in FIG. 1. In some cases, the gate driving circuit GDC may be disposed on both sides of the display panel DISP (e.g., in right and left portions of the display panel DISP), depending on the driving system, the design of the display panel, or the like.

The display device according to exemplary embodiments may be one of various types of display device, such as a liquid crystal display (LCD) device, an organic light-emitting display device, or a quantum dot display device. The display panel DISP according to exemplary embodiments may be one of various types of display panel, such as an LCD panel, an organic light-emitting display panel, or a quantum dot display panel.

Each of the subpixels SP arrayed in the display panel DISP may include one or more circuit elements (e.g., a transistor or capacitor).

For example, in a case in which the display panel DISP is an LCD panel, a pixel electrode is disposed in each of the subpixels SP, and a driving transistor may be electrically connected between the pixel electrode and the corresponding data line DL. The driving transistor may be turned on by the scan signal SCAN, supplied to a gate electrode through the gate line GL. When turned on, the driving transistor may output the data signal Vdata, supplied to a source electrode (or a drain electrode) through the data line DL, to the drain electrode (or the source electrode), so that the data signal Vdata is applied to the pixel electrode electrically connected to the drain electrode (or the source electrode). An electric field may be generated between the pixel electrode to which the data signal Vdata is applied and the common electrode COM to which a common voltage Vcom is applied, and capacitance may be formed between the pixel electrode and the common electrode COM.

Each of the subpixels SP may have a variety of structures depending on the type of the display panel, the function provided, the design, and the like.

Next, the multi-driving circuits for the multi-sensing function may include the multi-sensing circuit MSC, the photo-driving circuit PDC, the multi-controller MCTR, and the like.

The multi-sensing circuit MSC may be electrically connected to the plurality of common electrodes COM, disposed in the display panel DISP, through the plurality of read-out lines ROL disposed in the display panel DISP.

The photo-driving circuit PDC may drive the plurality of photo-driving lines PDL and the plurality of photo-control lines PCL, through which the driving signal Vdrv and the photo-control signal Vsto are transferred to the plurality of phototransistors PHT disposed in the display panel DISP.

The multi-controller MCTR may detect at least one of a touch and touch coordinates or detect at least one of light illumination and light-illuminated coordinates (i.e., a position designated by a user by light illumination, also referred to as photo-coordinates) by receiving sensing data from the multi-sensing circuit MSC.

In addition, the multi-controller MCTR may control the driving timing or the like of each of the multi-sensing circuit MSC and the photo-driving circuit PDC.

The multi-sensing circuit MSC may drive the plurality of common electrodes COM and sense the plurality of common electrodes COM. That is, the multi-sensing circuit MSC may drive the plurality of common electrodes COM by supplying a touch driving signal TDS to the plurality of common electrodes COM through the plurality of read-out lines ROL.

The photo-driving circuit PDC may drive the plurality of photo-driving lines PDL and the plurality of photo-control lines PCL. That is, the photo-driving circuit PDC may drive the plurality of photo-control lines PCL by outputting the photo-control signal Vsto to the plurality of photo-control lines PCL, and may drive the plurality of photo-driving lines PDL by outputting the photo-driving signal Vdrv to the plurality of photo-driving lines PDL.

Consequently, the photo-control signal Vsto may be applied to the gate electrodes PG of the plurality of phototransistors PHT through the plurality of photo-control lines PCL. The photo-driving signal Vdrv may be applied to the first electrodes PE1 of the plurality of phototransistors PHT through the plurality of photo-driving lines PDL.

In addition, the multi-sensing circuit MSC may sense the plurality of common electrodes COM by detecting a signal ROS from each of the plurality of common electrodes COM through the corresponding read-out line ROL among the plurality of read-out lines ROL. Here, the signal ROS, detected from the common electrode COM through the read-out line ROL, indicates the electrical state of the common electrode COM.

The signal ROS detected by the multi-sensing circuit MSC may be a signal generated in response to a finger of the user, a pen, or the like having touched the display panel. This signal may be necessary to determine at least one of a touch and touch coordinates.

In addition, when the display panel DISP is illuminated with light, the signal ROS detected by the multi-sensing circuit MSC may be a signal output from the phototransistor PHT disposed at a point illuminated with light. This signal may be necessary to determine at least one of light illumination and a light-illuminated position (i.e., a position designated by the user by light illumination).

The multi-sensing circuit MSC may generate sensing data on the basis of the signal ROS detected through the plurality of read-out lines ROL and output the sensing data to the multi-controller MCTR.

The multi-controller MCTR may detect a touch or touch coordinates on the display panel DISP according to the sensing data, or detect light illumination or light-illuminated coordinates (or photo-coordinates) on the display panel DISP, and output a sensing result.

Referring to FIG. 2, describing the basic multi-sensor configuration, the common sensors COM or the like may correspond to touch sensors, and the phototransistors PHT and the photocapacitors Cs may correspond to the photosensors PS.

Referring to FIG. 2, the plurality of common electrodes COM disposed in the same column may include an mth common electrode COM(m) and a (m+1)th common electrode COM(m+1). In addition, the plurality of read-out lines ROL may include an mth read-out line ROL(m) electrically connecting the mth common electrode COM(m) and the multi-sensing circuit MSC and an (m+1)th read-out line ROL(m+1) electrically connecting the (m+1)th common electrode COM(m+1) and multi-sensing circuit MSC.

Two or more phototransistors PHT may be disposed in the area of the mth common electrode COM(m), and the second electrode PE2 of each of the two or more phototransistors PHT in the area of the mth common electrode COM(m) may be electrically connected to the mth common electrode COM(m).

Likewise, two or more phototransistors PHT may be disposed in the area of the (m+1)th common electrode COM(m+1). The second electrode PE2 of each of the two or more phototransistors PHT disposed in the area of the (m+1)th common electrode COM(m+1) may be electrically connected to the (m+1)th common electrode COM(m+1).

The mth read-out line ROL(m) may overlap both the mth common electrode COM(m) and the (m+1)th common electrode COM(m+1). However, the mth read-out line ROL(m) may only be electrically connected to the mth common electrode COM(m) through a contact hole CNT_COM_ROL while being electrically insulated from the (m+1)th common electrode COM(m+1).

The (m+1)th read-out line ROL(m+1) may overlap both the mth common electrode COM(m) and the (m+1)th common electrode COM(m+1). However, the (m+1)th read-out line ROL(m+1) may only be electrically connected to the (m+1)th common electrode COM(m+1) through a contact hole CNT_COM_ROL while being electrically insulated from the mth common electrode COM(m).

Since the mth common electrode COM(m) and the (m+1)th common electrode COM(m+1) are disposed in the same column, the two or more data lines DL overlapping the mth common electrode COM(m) may be the same as the two or more data lines DL overlapping the (m+1)th common electrode COM(m+1).

Each of the mth read-out line ROL(m) and the (m+1)th read-out line ROL(m+1) may be disposed in the same direction as the two or more data lines DL.

Figure 3:
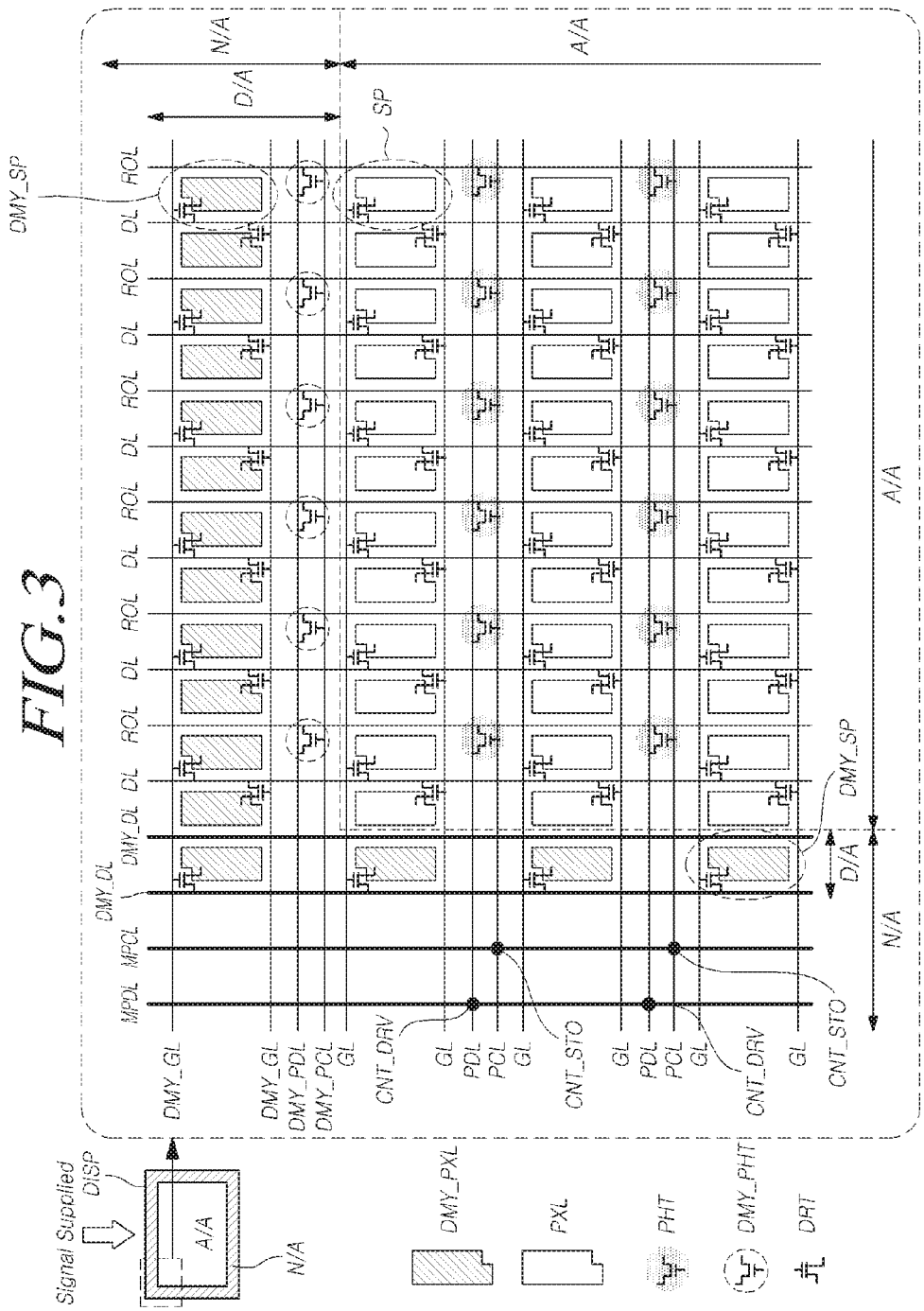
FIGS. 3 and 4 illustrate basic structures of the display panel according to exemplary embodiments.
Figure 4:
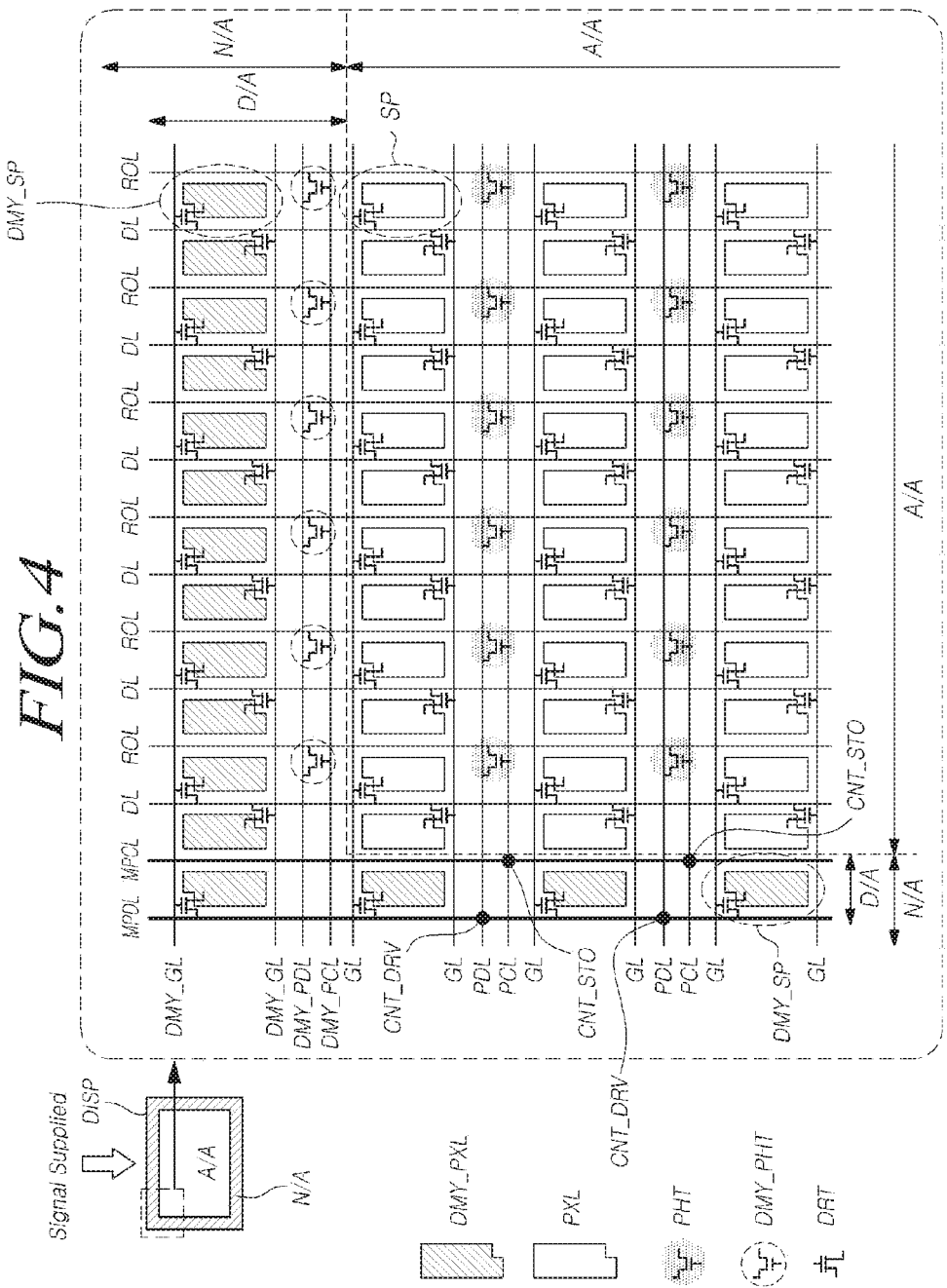

FIGS. 3 and 4 are plan views illustrating basic structures of the display panel DISP according to exemplary embodiments.

Referring to FIGS. 3 and 4, the display panel DISP includes an active area A/A corresponding to a display area and a non-active area N/A located at the periphery of the active area A/A and corresponding to a non-display area.

FIGS. 3 and 4 are plan views illustrating an upper left area of the display panel DISP, including a portion of the active area A/A and a portion of the non-active area N/A. The upper left area is an area to which a variety of signals (e.g., a data signal, a gate driving-related voltage, a common voltage, a photo-driving signal, and a photo-control signal) are supplied via the data driving circuit DDC, a printed circuit board (PCB), or the like.

Referring to FIGS. 3 and 4, in the display panel DISP, the plurality of data lines DL and the plurality of read-out lines ROL are disposed in the column direction (or vertical direction), and the plurality of gate lines GL, the plurality of photo-driving lines PDL, and the plurality of photo-control lines PCL may be disposed in the row direction (or horizontal direction).

Referring to FIGS. 3 and 4, in the active area A/A, the plurality of subpixels SP are arrayed in the form of a matrix. Each of the plurality of subpixels SP may include a pixel electrode PXL and a driving transistor DRT. The driving transistor DRT may be turned on by the scan signal SCAN, applied to the gate electrode through the corresponding gate line GL, to apply the data signal Vdata, supplied from the corresponding data line DL, to the pixel electrode PXL.

In addition, the plurality of phototransistors PHT may be disposed in the active area A/A.

A single phototransistor PHT may be allocated to a single subpixel SP or two or more subpixels SP.

Accordingly, a single photo-driving line PDL may be allocated to a single subpixel SP or two or more subpixels SP. A single photo-control line PCL may be allocated to a single subpixel SP or two or more subpixels SP.

In an example, as illustrated in FIGS. 3 and 4, one or more rows of phototransistors PHT may be arrayed in every corresponding subpixel row. That is, one or more rows of phototransistors PHT may be arrayed between two corresponding subpixel rows. In this case, one or more photo-driving lines PDL and one or more photo-control lines PCL may be disposed between two corresponding subpixel rows.

In another example, one or two rows of phototransistors PHT may be arrayed for two corresponding subpixel rows. For example, in a case in which a first subpixel row, a second subpixel row, a third subpixel row, and a fourth subpixel row are sequentially arrayed, one or more rows of phototransistors PHT may be arrayed between the first subpixel row and the second subpixel row, no row of phototransistors PHT may be arrayed between the second subpixel row and the third subpixel row, and one or more rows of phototransistors PHT may be arrayed between the third subpixel row and the fourth subpixel row. In this case, one or more photo-driving lines PDL and one or more photo-control lines PCL may be disposed between the first subpixel row and the second subpixel row, neither a photo-driving line PDL nor a photo-control line PCL may be disposed between the second subpixel row and the third subpixel row, and one or more photo-driving lines PDL and one or more photo-control lines PCL may be disposed between the third subpixel row and fourth subpixel row.

Referring to FIGS. 3 and 4, phototransistors PHT, one or more photo-driving lines PDL, and one or more photo-control lines PCL may be disposed between two corresponding gate lines GL.

In addition, referring to FIGS. 3 and 4, the non-active area N/A may include a dummy pixel area D/A in which one or more dummy subpixel rows are disposed.

The dummy pixel area D/A may be disposed on one or both sides of the active area A/A, or may be present at the entire periphery of the active area A/A.

Each of the plurality of dummy subpixels DMY_SP, included in one or more subpixel rows, may include a dummy pixel electrode DMY_PXL. In addition, each of the plurality of dummy subpixels DMY_SP may further include a driving transistor DRT.

The one or more subpixel rows are designed to be the same as the subpixel rows in the active area A/A. That is, in the one or more subpixel rows, dummy gate lines DMY_GL and the dummy pixel electrode DMY_PXL are disposed, and in some cases, dummy data lines DMY_DL may be disposed.

Here, the dummy data lines DMY_DL may be made of the same material as at least one of the data lines DL and the common electrodes COM. The dummy gate lines DMY_GL may be made of the same material as the gate lines GL.

In a driving transistor DRT, disposed in each of the plurality of dummy subpixels DMY_SP, a gate electrode may be connected to a corresponding dummy gate line DMY_GL, a source electrode (or drain electrode) may be connected to a corresponding dummy data line DMY_DL, and a drain electrode (or a source electrode) may be connected to a dummy pixel electrode DMY_PXL. The driving transistor DRT, disposed in each of the plurality of dummy subpixels DMY_SP, may perform on-off operations, or may remain in an off state constantly. A signal, applied to the dummy gate line DMY_GL, may have the same form as the scan signal SCAN applied to the active area A/A. The dummy gate line DMY_GL may be in a floating state, or may have a turned-off level voltage (e.g., a low-level voltage) constantly applied thereto.

Due to the dummy pixel area D/A disposed at the periphery of the active area A/A, effects of preventing light leakage inducing, static electricity, rubbing stain, and the like, can be expected.

In addition, in the dummy pixel area D/A in the non-active area N/A, the dummy phototransistors DMY_PHT may be disposed, and dummy photo-driving lines DMY_PDL and dummy photo-control lines DMY_PCL may also be disposed.

That is, the dummy phototransistors DMY_PHT, the dummy photo-driving lines DMY_PDL, and the dummy photo-control lines DMY_PCL may be disposed between the dummy pixel electrodes DMY_PXL or the dummy gate lines DMY_GL and the active area A/A.

In addition, referring to FIG. 3, in terms of signal supply positions, a main photo-driving line MPDL and a main photo-control line MPCL extending in a column direction (or vertical direction) must be disposed in the non-active area N/A, such that the photo-driving signal Vdrv and the photo-control signal Vsto entering the display panel DISP can be transferred to the plurality of photo-driving lines PDL and the plurality of photo-control lines PCL, disposed in a row direction (or horizontal direction), through the main photo-driving line MPDL and the main photo-control line MPCL.

The main photo-driving line MPDL disposed in the non-active area N/A is connected to the photo-driving lines PDL, disposed in the row direction (or horizontal direction), through a plurality of contact holes CNT_DRV. The main photo-control line MPCL disposed in the non-active area N/A is connected to the photo-control lines PCL, disposed in the row direction (or horizontal direction), through a plurality of contact holes CNT_STO.

Referring to FIG. 3, since the dummy subpixels DMY_SP, including the dummy pixel electrodes DMY_PXL in the non-active area N/A, are disposed closest to the active area A/A, the main photo-driving line MPDL and the main photo-control line MPCL must be disposed in areas outward of the dummy subpixels DMY_SP or the dummy data lines DMY_DL. Accordingly, the width of the non-active area N/A must be increased. That is, the presence of the dummy pixel area D/A enforces the main photo-driving line MPDL and the main photo-control line MPCL to be disposed at the periphery of the dummy pixel area D/A, thereby inevitably increasing the bezel area.

Referring to FIG. 4, in a case in which the dummy pixel area D/A is present in the non-active area N/A, the dummy data lines DMY_DL connected to the source electrode (or drain electrode) of the driving transistor DRT of each of the dummy subpixels DMY_SP may be used as the main photo-driving line MPDL and the main photo-control line MPCL, without the need for additionally disposing column-directional lines, through which the photo-driving signal Vdrv and the photo-control signal Vsto are transferred, in the non-active area N/A. This can prevent the bezel area from being increased by the main photo-driving line MPDL and the main photo-control line MPCL.

In this case, at least one of the main photo-driving line MPDL and the main photo-control line MPCL may be connected to the plurality of dummy subpixels DMY_SP. That is, at least one of the main photo-driving line MPDL and the main photo-control line MPCL may be connected to the source electrode (or drain electrode) of the driving transistor DRT included in each of the plurality of dummy subpixels DMY_SP.

In addition, in this case, the main photo-driving line MPDL and the main photo-control line MPCL may be made of the same material as the data lines DL.

Referring to FIG. 4, the photo-driving lines PDL and the photo-control lines PCL may be disposed in the same direction as the gate lines GL. The main photo-driving line MPDL and the main photo-control line MPCL may be disposed in the same direction as the data lines DL intersecting the gate lines GL.

Referring to FIGS. 3 and 4, the common electrodes COM electrically connected to the read-out lines ROL are omitted for the sake of brevity. The size of each area of the common electrodes COM may be equal to or greater than the size of the area of two subpixels SP.

In addition, in a case in which double rate driving (DRD) able to reduce the number of channels of the data driving circuit DDC is performed, the display device according to exemplary embodiments has a structure in which a single gate line GL is disposed above each subpixel row, another single gate line GL is disposed below the same subpixel row, and two subpixel rows share a single data line DL, as illustrated in FIGS. 3 and 4.

In addition, the plurality of subpixels SP arrayed in the display panel DISP according to exemplary embodiments may be comprised of red subpixels, green subpixels, blue subpixels, and the like. According to exemplary embodiments, a red color filter (or pigment), a green color filter (or pigment), a blue color filter (or pigment), and the like, necessary for realizing corresponding colors of light, may be disposed in each of the plurality of subpixels SP. Here, the red color filter (or pigment), the green color filter (or pigment), the blue color filter (or pigment), and the like, may be disposed on a color filter substrate, and may be disposed on a thin-film transistor (TFT) array substrate.

Here, the phototransistor PHT may be disposed to overlap an area in which each of the red color filter (or pigment), the green color filter (or pigment), and the blue color filter (or pigment) is disposed. Hereinafter, a case in which light, such as a laser beam, emitted from the beam generator BG, arrives at each of the color filters prior to a phototransistor PHT, will be described.

In a case in which light emitted from the beam generator BG has a specific color, a phototransistor PHT, the color of which is the same as or similar to the color of the light emitted from the beam generator BG, mainly responds to the light, and thus is used for photosensing.

For example, in a case in which the light emitted from the beam generator BG has a red wavelength band, the light emitted from the beam generator BG may be incident on the phototransistor PHT overlapping each of the red color filter (or pigment), the green color filter (or pigment), and the blue color filter (or pigment) by passing through each of the red color filter (or pigment), the green color filter (or pigment), and the blue color filter (or pigment). At this time, the red phototransistor PHT disposed to overlap the red color filter mainly responds to the light, thereby generating a leakage current. However, the phototransistors, disposed to the green color filter and the blue color filter, generate smaller amounts of leakage currents, due to having lower photoresponsivity. This is because light in the red wavelength band has less ability to pass through the green color filter or the blue color filter. Accordingly, in a case in which light incident on the pointed area of the display panel is in the red wavelength band, one or more phototransistors PHT overlapping the red color filter may be used to mainly respond to the light to generate a leakage current, which may be used for photosensing, and determine the light-illuminated position according to the photosensing.

Figure 5:
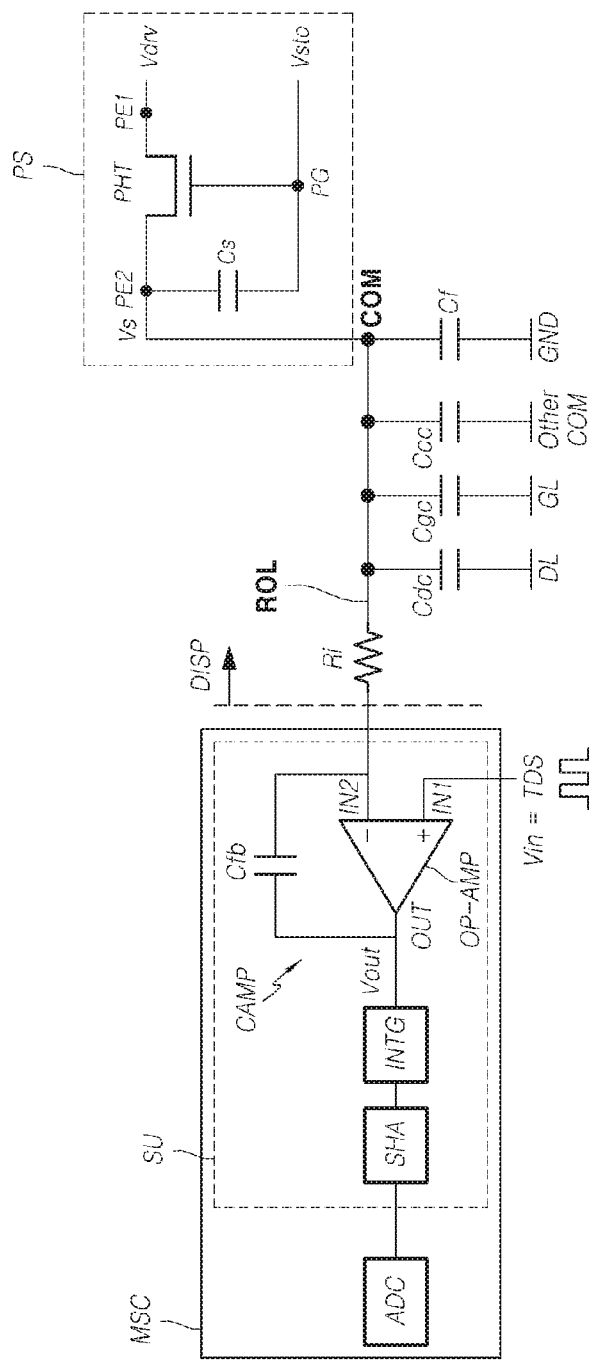
FIG. 5 is a circuit diagram illustrating a multi-sensing system according to exemplary embodiments.
Figure 6:
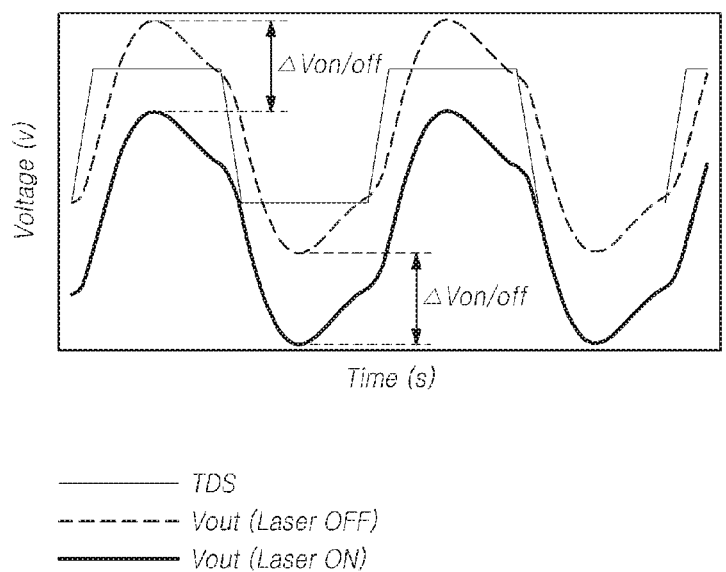
FIG. 6 is a graph illustrating a signal output from the phototransistor, depending on whether or not light is illuminated, in the display device according to exemplary embodiments.

FIG. 5 is a circuit diagram illustrating a multi-sensing system according to exemplary embodiments, and FIG. 6 is a graph illustrating a signal output from the phototransistor PHT, depending on whether or not light is illuminated, in the display device according to exemplary embodiments.

Referring to FIG. 5, the multi-sensing system according to exemplary embodiments may include a photosensor PS including a phototransistor PHT or the like, a common electrode COM serving as a touch sensor, a multi-sensing circuit MSC detecting the photosensor PS and the common electrode COM, and the like.

The photosensor PS is connected to the common electrode COM, and the common electrode COM is connected to the multi-sensing circuit MSC through a read-out line ROL. Thus, the read-out line ROL is a shared line that the multi-sensing circuit MSC uses to detect the photosensor PS and the common electrode COM.

The multi-sensing circuit MSC may include a plurality of sensors SU and one or more analog-to-digital converters ADC.

Each of the plurality of sensors SU may include a charge amplifier CAMP, an integrator INTG outputting an integrated value by integrating an output signal Vout of the charge amplifier CAMP, a sample-and-hold circuit SHA storing the integrated value of the integrator INTG.

The charge amplifier CAMP may include a first input end IN1, to which the touch driving signal TDS is input as an input signal Vin, a second input end IN2 connected to a first multiplexer (not shown), an operational amplifier OP-AMP having an output end OUT outputting an output signal Vout, a feedback capacitor Cfb connected between the second input end IN2 and the output end OUT, and the like. The first input end IN1 may be a non-inverting input end, and the second input end IN2 may be an inverting input end.

The multi-sensing circuit MSC may further include a first multiplexer (not shown) selectively connecting one or more common electrodes COM among the plurality of common electrodes COM to the plurality of sensors SU, a second multiplexer (not shown) connecting one or more sensors SU among the plurality of sensors SU to the analog-to-digital converters ADC, and the like.

First, touch sensing will be described. In the event of a touch, the multi-sensing circuit MSC may detect at least one of the touch and touch coordinates by detecting a variation in finger capacitance Cf of each of the common electrodes COM.

The multi-sensing circuit MSC may detect an increase in load (or an increase in Cf) due to the finger capacitance Cf, according to a voltage difference Vout-Vin between the touch driving signal TDS, applied to the common electrodes COM serving as the touch sensors (or touch electrodes), and the output signal Vout of the charge amplifier CAMP.

The multi-sensing circuit MSC outputs sensing data by converting a voltage difference Vout-Vin, accumulated using the integrator INTG in a touch sensing period, into a digital sensing value using the analog-to-digital converter ADC. The multi-controller MCTR can detect the touch using the sensing data.

Subsequently, photosensing will be described.

In the photosensing according to exemplary embodiments, when the phototransistor PHT in a turned-off state is illuminated with light, a leakage current (or an off-current) is generated by the phototransistor PHT due to the photo-response thereof, and a quantity of electricity charged in the photocapacitor Cs due to the generation and increase of the leakage current can be detected using the voltage difference Vout-Vin between the touch driving signal TDS, applied to the common electrode COM, and the output signal Vout of the charge amplifier CAMP. Here, the photocapacitor Cs may be absent. Even in the case the photocapacitor Cs is absent, electricity can be charged due to the capacitance component of the second electrode PE2 of the phototransistor PHT.

For the photosensing, the phototransistor PHT must remain in the turned-off state. Thus, the photo-control signal Vsto applied to the gate electrode GP of the phototransistor PHT has a turn-off-level voltage by which the phototransistor PHT can be turned off.

Both the touch sensing and the photosensing commonly use the common electrodes COM and the read-out lines ROL. In addition, the multi-sensing circuit MSC performs the touch sensing and photosensing by detecting an electrical state (e.g., a charge or capacitance) of the common electrode COM through the read-out line ROL. The read-out line ROL is a signal line shared for the touch sensing and the photosensing.

In the photosensing, the output signal Vs of the phototransistor PHT is combined with a reference voltage (in the form of a pulse), thereby producing the voltage difference Vout-Vin necessary for the photosensing. Here, the reference voltage is a pulse voltage that is not changed by the touch or phototransistor PHT, and is the same as both the input signal Vin corresponding to the touch driving signal TDS and the output value Vout of the charge amplifier CAMP (voltage difference=0).

FIG. 6 illustrates a simulation result of the sensing performed using a laser beam as illumination light in an environment in which the second electrodes PE2 of about 70 phototransistors PHT are connected to a single common electrode COM.

Referring to FIG. 6, in the case of laser sensing, the center value of the output signal Vout of the charge amplifier CAMP moves downward, in response to a laser being turned on and off.

When a leakage current (or off-current) is generated in the phototransistors PHT due to the laser illumination, electric charges enter the second input end IN2 of the operation amplifier OP-AMP in the sensor SU and are then accumulated by a feedback capacitor Cfb, thereby raising electric potential. In this case, the second input end IN2 is an inversion input end, in the point of view of the operation amplifier OP-AMP. That is, when the electric potential is raised due to the leakage current (or off-current), the overall values of the output signal Vout may consequently be lowered, as illustrated in FIG. 6.

Accordingly, as illustrated in FIG. 6, the voltage level of the output signal Vout, in the case of light illumination, is lowered from the output signal Vout, in the case in which no light illumination, by ΔVon/off.

However, since the output signal Vout, in the case of light illumination, does not affect the gain of the operation amplifier OP-AMP, like the finger capacitance Cf for the touch sensing, only the center value of the output signal Vout is moved downward on the graph while the amplitude of the output signal Vout remains the same.

Accordingly, the output signal Vout in the case of light illumination and the output signal Vout in the case of no light illumination have the same or similar signal waveforms (e.g., frequencies, phases, or amplitudes). The output signal Vout in the case of light illumination and the output signal Vout in the case of no light illumination have the same signal waveform as the touch driving signal TDS.

Returning to FIG. 5, when the touch driving signal TDS is applied to the common electrode COM during the multi-sensing driving period, the common electrode COM may generate parasitic capacitance Cdc, Cgc, and Ccc together with the data lines DL, the gate lines GL, and the remaining common electrodes COM in the display panel DISP. Such parasitic capacitance Cdc, Cgc, and Ccc is reasons of lowering touch sensitivity.

Accordingly, the display device according to exemplary embodiments may perform load-free driving (LFD) to prevent the parasitic capacitance Cdc, Cgc, and Ccc from being generated between the common electrode COM and the other patterns, such as DL, GL, and other COM, in the display panel DISP when the touch driving signal TDS is applied to the common electrode COM.

In the load-free driving, an LFD signal the same as or similar to the touch driving signal TDS applied to the common electrode COM may be applied to the other patterns, such as DL, GL, and other COM, in the display panel DISP. The LFD signal corresponds to one or more of the frequency, phase, and amplitude ΔV of the touch driving signal TDS. Accordingly, the potential difference between the common electrode COM and the other patterns, such as DL, GL, and other COM, in the display panel DISP can be removed, thereby preventing the parasitic capacitance Cdc, Cgc, and Ccc.

Figure 7:
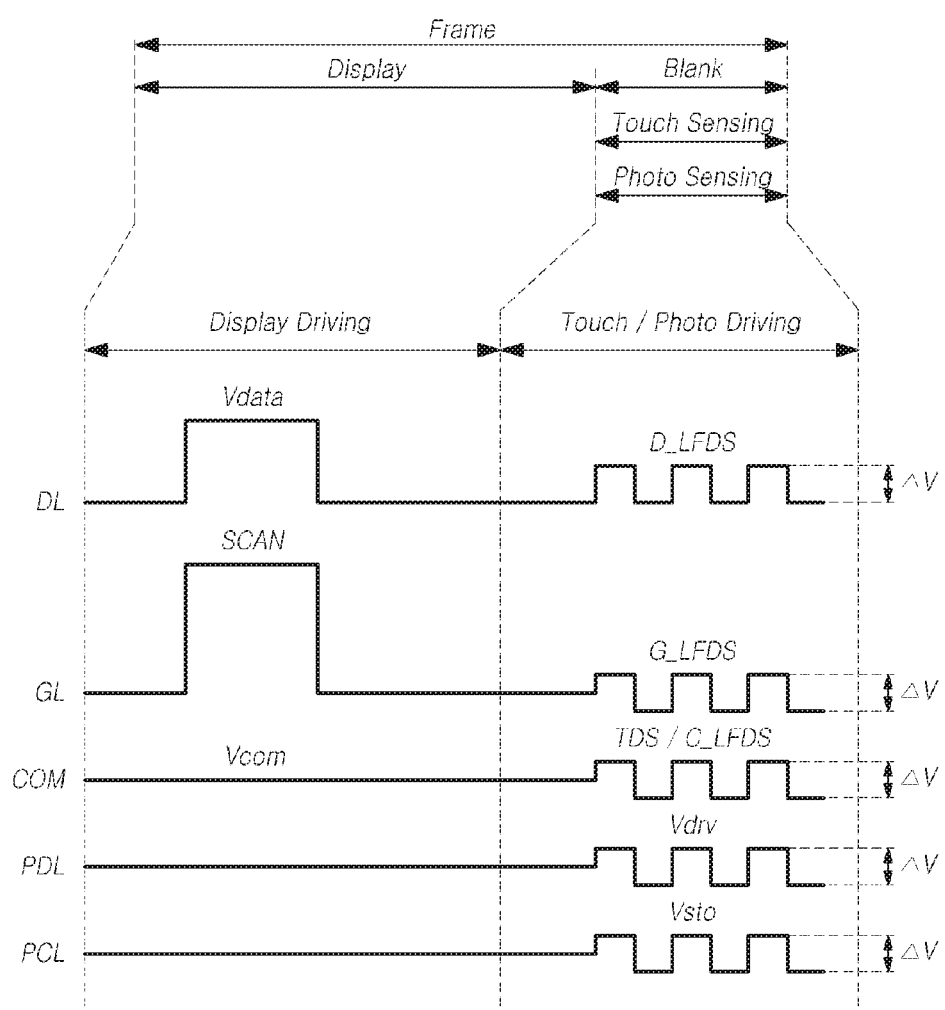
FIG. 7 is a driving timing diagram of the display device according to exemplary embodiments.

FIG. 7 is a driving timing diagram of the display device according to exemplary embodiments.

Referring to FIG. 7, the display device according to exemplary embodiments may perform display driving and multi-sensing (i.e., touch sensing and photosensing) in different periods of time.

For example, during a one-frame period, the display driving may be performed during an active period, while the multi-sensing may be performed during a blank period. During the blank period, the touch sensing and the photosensing are simultaneously performed.

Referring to FIG. 7, during the display driving period, the data signal Vdata may be applied to the data lines DL, the scan signal SCAN may be applied to the gate lines GL, and the common voltage Vcom may be applied to all of the common electrodes COM.

In addition, during the display driving period, the photo-driving lines PDL and the photo-control lines PCL may be floated, or may be supplied with the common voltage Vcom, the ground voltage, or a voltage having no effect on the display driving-related lines or electrodes.

In other words, during the display driving period, the photo-driving circuit PDC outputs the common voltage Vcom, having a certain voltage level, to the plurality of common electrodes COM through the plurality of read-out lines ROL. The photo-driving circuit PDC floats the photo-driving lines PDL and the photo-control lines PCL, or outputs the photo-driving signal Vdrv and the photo-control signal Vsto having a certain voltage level to the photo-driving lines PDL and the photo-control lines PCL. Here, during the display driving period, the photo-driving signal Vdrv and the photo-control signal Vsto having a certain voltage level may be the same as, for example, the common voltage in the form of a direct current (DC) voltage.

Referring to FIG. 7, during the blank period subsequent to the display driving period, the touch driving for the touch sensing and the photo-driving for the photosensing are simultaneously performed.

During the blank period, the multi-sensing circuit MSC outputs the touch driving signal TDS, the voltage level of which swings, to the plurality of common electrodes COM through the plurality of read-out lines ROL, for the touch sensing.

During the blank period, the photo-driving circuit PDC outputs the photo-driving signal Vdrv and the photo-control signal Vsto, the voltage level of which swings, to the photo-driving lines PDL and the photo-control lines PCL, for the touch sensing.

During the blank period, the photo-driving signal Vdrv and the photo-control signal Vsto may correspond to at least one of the frequency, phase, and amplitude $\Delta V$ of the touch driving signal TDS.

Due to such similarities in signal characteristics, the photo-driving signal Vdrv and the photo-control signal Vsto also serve as an LFD signal. That is, unnecessary parasitic capacitance may not be generated between the photo-driving lines PDL or the photo-control lines PCL and the common electrodes COM.

Since the photosensing uses a leakage current generated from the phototransistor PHT in response to light illumination in a state in which the phototransistor PHT is turned off, the highest voltage level of the photo-control signal Vsto must not be raised to a level, at which the phototransistor PHT is turned on, during the blank period, despite the swinging of the voltage level of the photo-control signal Vsto.

Accordingly, during the blank period, the photo-control signal Vsto may swing within a turn-off voltage range in which the phototransistor PHT is turned off.

Herein, the touch driving signal TDS, the photo-driving signal Vdrv, and the photo-control signal Vsto, the voltage level of which is variable, may be referred to as an AC signal, a modulation signal, a pulse signal, or the like.

In addition, during the blank period, an LFD signal D_LFDS may be applied to the data lines DL for the low-frequency driving of the data lines DL. At least one of the frequency, phase, amplitude $\Delta V$, and the like, of the LFD signal D_LFDS corresponds to that of the touch driving signal TDS.

In addition, during the blank period, an LFD signal G_LFDS may be applied to the gate lines GL for the low-frequency driving of the gate lines GL. At least one of the frequency, phase, amplitude $\Delta V$, and the like, of the LFD signal G_LFDS corresponds to that of the touch driving signal TDS.

In addition, during the blank period, for the low-frequency driving of the common electrodes COM, an LFD signal C_LFDS may be applied to common electrodes COM, among the plurality of common electrodes COM, which are not supposed to be sensed.

Figure 8:
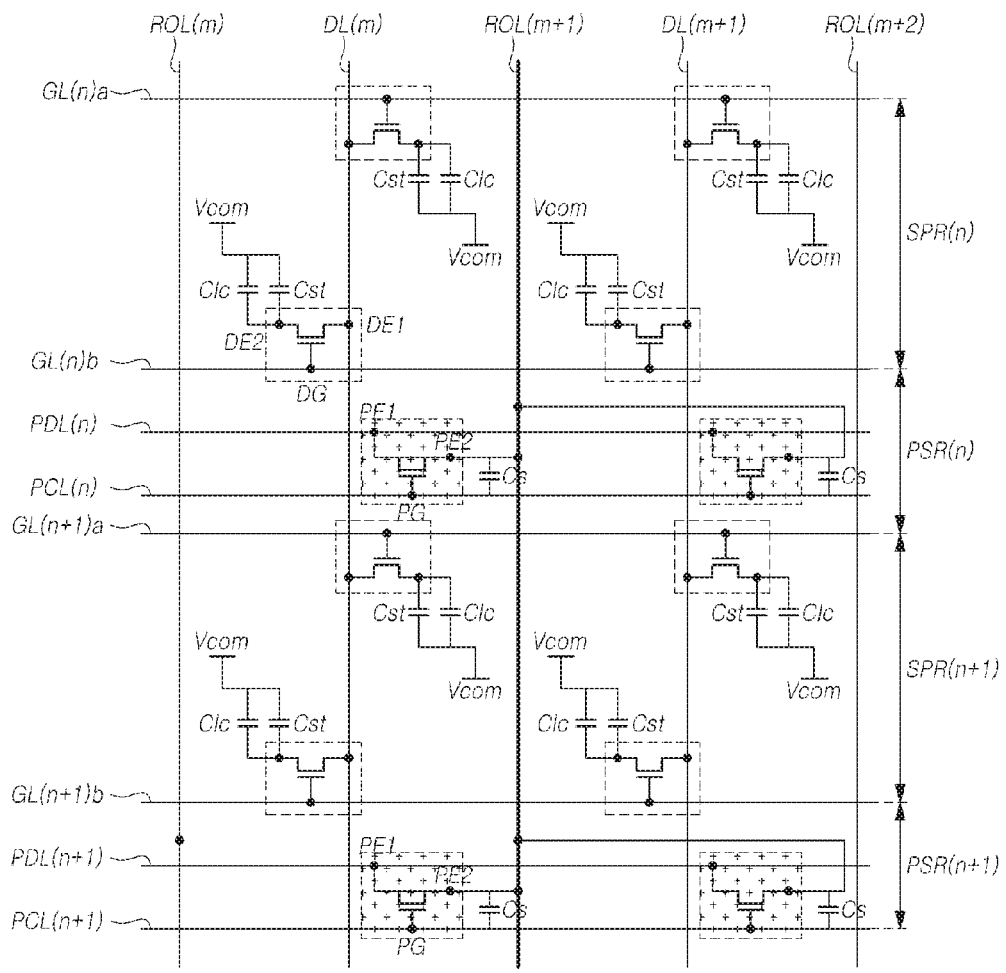
FIG. 8 illustrates a circuit structure of pixels disposed in the display panel according to exemplary embodiments.

FIG. 8 illustrates a circuit structure of pixels disposed in the display panel DISP according to exemplary embodiments.

Referring to FIG. 8, a pixel disposed in the display panel DISP may include a subpixel row SPR for driving a display and a photo sensor row PSR for photosensing. In addition, various circuit elements and signal lines for display driving and photosensing may be disposed. In addition, the common electrodes COM for providing a touch sensing function may be disposed in a manner corresponding to a plurality of pixels.

Here, the pixels corresponding to the common electrode COM means that the plurality of pixels correspond to the area in which the display driving or the touch sensing is performed by the common electrode COM, so that the area of the plurality of pixels does not necessarily overlap the common electrode COM. That is, the area corresponding to the common electrode COM may mean each of "touch blocks" defined by the common electrodes COM disposed separately.

As an example of the signal lines, a plurality of gate lines GL for display driving, and a plurality of photo-control lines PCL and a plurality of photo-driving lines PDL for photosensing, may be disposed in a single direction. A plurality of data lines DL for display driving and a plurality of read-out lines ROL for touch sensing and photosensing may be included in a direction intersecting the gate lines GL.

The structure of the pixel illustrated in FIG. 8 is an example in which the display driving is performed by a double rate driving (DRD) method. Two gate lines GL may be disposed for a single subpixel row SPR. That is, two n-th gate lines GL(n)a and GL(n)b may be disposed to drive the n-th subpixel row SPR(n), and two (n+1)-th gate lines GL(n+1)a and GL(n+1)b may be disposed to drive the (n+1)-th subpixel row SPR(n+1). In addition, a single data line DL may be disposed one for two subpixel columns.

In this pixel structure, the photo-control line PCL and the photo-driving line PDL may be disposed between corresponding gate lines GL, in an area between corresponding subpixel rows SPR. For example, the n-th photo-control line PCL(n) and the n-th photo-driving line PDL(n) may be disposed between the n-th gate line GL(n)b and the (n+1)-th gate line GL(n+1)a. Each of the read-out lines ROL may be disposed between the corresponding subpixel columns, in an area in which none of the data lines DL are disposed. That is, the data lines DL and the read-out lines ROL may be alternately disposed.

In each of the subpixel rows SPR, a driving transistor DRT for controlling the display driving may be disposed.

The driving transistor DRT may include a gate electrode DG electrically connected to the gate line GL, a first electrode DE1 electrically connected to the data line DL, and a second electrode DE2 electrically connected to a pixel electrode PXL. Here, depending on the type of the driving transistor DRT, the first electrode DE1 may be a source electrode or a drain electrode. The second electrode DE2 may be a drain electrode or a source electrode.

Storage capacitance Cst may be provided in the subpixel row SPR by a data signal Vdata applied to the pixel electrode PXL and a common voltage Vcom applied to the common electrode COM. Liquid crystal capacitance Clc may be generated between the pixel electrode PXL and the common electrode COM, due to a liquid crystal layer.

A phototransistor PHT for photosensing may be disposed in each photo sensor row PSR.

The phototransistor PHT includes a gate electrode PG electrically connected to a corresponding photo-control line PCL, a first electrode PE1 electrically connected to a corresponding photo-driving line PDL, and a second electrode PE2 electrically connected to a corresponding read-out line ROL. Here, depending on the type of the phototransistor PHT, the first electrode PE1 may be a source electrode or a drain electrode. The second electrode PE2 may be a drain electrode or a source electrode.

In addition, a photo capacitor Cs may be disposed in the photo sensor row PSR to accumulate electric charge corresponding to an off-current due to photosensing. The photo capacitor Cs may be a capacitor disposed as a separate electrode or a capacitor produced by parasitic capacitance.

The photo-control signal Vsto having a level, at which the phototransistor PHT is turned off, may be applied to the phototransistor PHT through the photo-control line PCL. In a state in which the photo-driving signal Vdrv is applied to the photo-driving line PDL, the phototransistor PHT may generate an off-current in response to external light. A signal due to photosensing can be detected through the read-out line ROL electrically connected to the phototransistor PHT.

Here, each of the read-out lines ROL may be electrically connected to a corresponding common electrode COM providing a touch sensing function. In addition, the read-out line ROL may be electrically connected to all of the phototransistors PHT disposed in an area corresponding to the common electrode COM electrically connected to the read-out line ROL.

That is, signals, output from all of the phototransistors PHT disposed in an area in which the touch sensing is performed by a common electrode COM, may be detected through a single read-out line ROL electrically connected to the common electrode COM.

In a case in which the circuit structure illustrated in FIG. 8 has an area corresponding to a single common electrode COM, for example, the (m+1)-th read-out line ROL(m+1) may be electrically connected to the common electrode COM corresponding to the area illustrated in FIG. 8. The m-th read-out line ROL(m) and the (m+2)-th read-out line ROL(m+2) may be electrically connected to other common electrodes COM.

In addition, the second electrodes PE2 of all of the phototransistors PHT illustrated in FIG. 8 may be electrically connected to the (m+1)-th read-out line ROL(m+1).

Therefore, the touch sensing and the photosensing may be performed according to the signal detected in the corresponding area through the (m+1)-th read-out line ROL(m+1).

Since signals output from all of the phototransistors PHT disposed in the corresponding area are detected through a single read-out line ROL, the magnitude of the signal output from the phototransistor PHT may be increased, thereby improving photosensing performance.

Here, at least one of all of the phototransistors PHT disposed in an area corresponding to a single common electrode COM may be directly connected to the read-out line ROL.

Alternatively, at least one of all of the phototransistors PHT disposed in an area corresponding to a single common electrode COM may be electrically connected to a read-out line ROL through a separately-provided component, such as a signal line or an electrode, or through an existing component, such as a signal line or an electrode.

Figure 9:
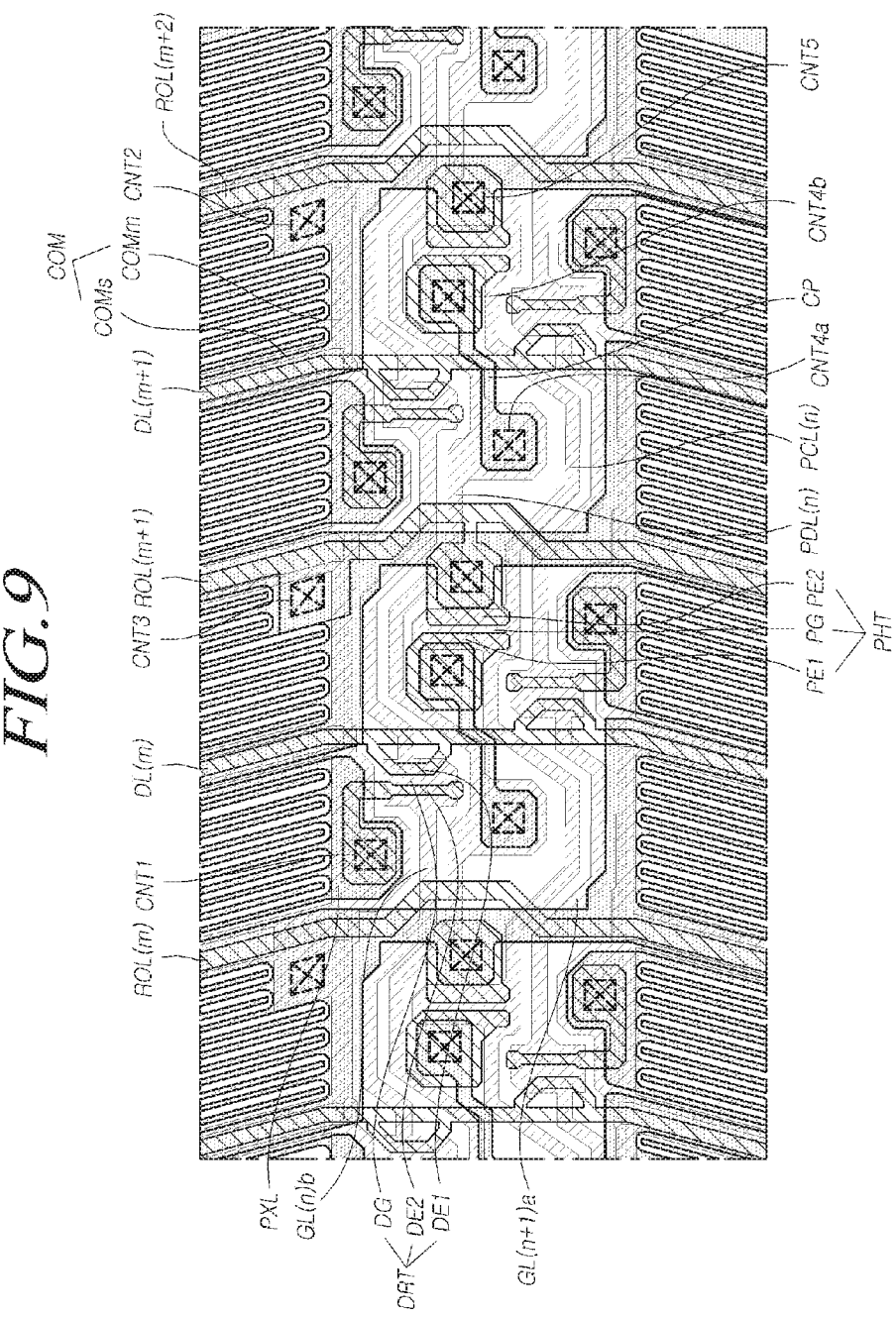
FIG. 9 illustrates a planar structure of pixels disposed in a display panel according to exemplary embodiments.

FIG. 9 illustrates a planar structure of pixels disposed in a display panel according to exemplary embodiments, wherein an area corresponding to the n-th subpixel row SPR(n) and the n-th photo sensor row PSR(n) illustrated in FIG. 8 is illustrated.

Referring to FIG. 9, a single pixel electrode PXL may be disposed in a corresponding area between the read-out line ROL and the data line DL. A common electrode COM generating an electric field together with the pixel electrode PXL may be disposed in the entirety of the area corresponding to the pixel electrode PXL. For example, the pixel electrode PXL and the common electrode COM may be disposed on the same layer, and may be made of the same material.

The pixel electrode PXL may be connected to the second electrode DE2 of the driving transistor DRT through a first contact hole CNT1.

The common electrode COM may include a main common electrode COMm and a subsidiary common electrode COMs, made of materials disposed on different layers. For example, the main common electrode COMm may be made of the same material as the pixel electrode PXL, and the subsidiary common electrode COMs may be made of the same material as the gate line GL. The main common electrode COMm and the subsidiary common electrode COMs may be connected to each other through a second contact hole CNT2. That is, in the structure in which the main common electrode COMm is disposed on the same layer as the pixel electrode PXL, the subsidiary common electrode COMs may be further disposed to generate capacitance between the second electrode DE2 of the driving transistor DRT, to which a data signal Vdata is applied, and the common electrode COM.

In addition, since the common electrode COM provides a touch sensing function, the common electrode COM may be electrically connected to one of the plurality of read-out lines ROL disposed in the corresponding area. For example, the common electrode COM may be connected to the (m+1)-th read-out line ROL(m+1) through a third contact hole CNT3.

A driving transistor DRT and a phototransistor PHT may be disposed in each of the areas between the read-out lines ROL and the data lines DL.

Here, a phototransistor PHT may be disposed in each of the areas between the read-out lines ROL and the data lines DL, or may be disposed between every two read-out lines ROL.

For example, as illustrated in FIG. 9, a phototransistor PHT may be disposed between the (m+1)-th read-out line ROL(m+1) and the m-th data line DL(m). In addition, a phototransistor PHT may be disposed between the (m+2)-th read-out line ROL(m+2) and the (m+1)-th data line DL(m+1).

The first electrode PE1 of the phototransistor PHT may be electrically connected to the n-th photo-driving line PDL(n).

Here, the first electrode PE1 of the phototransistor PHT and the n-th photo-driving line PDL(n) may be disposed on different layers, and may be directly connected to each other through a contact hole or may be connected to each other through a connection pattern.

For example, the n-th photo-driving line PDL(n) may be disposed in the same layer as the gate line GL, and the first electrode PE1 of the phototransistor PHT may be disposed in the same layer as the data line DL. The first electrode PE1 of the phototransistor PHT and the n-th photo-driving line PDL(n) may be electrically connected to each other through a connection pattern CP1 and two fourth contact holes CNT4a and CNT4b. Here, the connection pattern CP1 may be made of the same material as the common electrode COM.

The second electrodes PE2 of all of the phototransistors PHT disposed in the area corresponding to the common electrode COM may be electrically connected to the (m+1)-th read-out line ROL(m+1).

Here, the second electrodes PE2 of at least some of the phototransistors PHT disposed in the area corresponding to the common electrode COM, electrically connected to the (m+1)-th read-out line ROL(m+1), may be electrically connected to the (m+1)-th read-out line ROL(m+1) through a separate connected line disposed in the same direction as the n-th photo-control line PCL(n) or the n-th photo-driving line PDL(n).

Alternatively, the second electrode PE2 of the phototransistor PHT may be connected to the common electrode COM, and thus, be electrically connected to the (m+1)-th read-out line ROL(m+1) connected to the common electrode COM.

For example, as illustrated in FIG. 9, the second electrode PE2 of the phototransistor PHT disposed between the m-th data line DL(m) and the (m+1)-th read-out line ROL(m+1) may be connected directly to the (m+1)-th read-out line ROL(m+1). Further, the second electrode may be connected to the common electrode COM through a fifth contact hole CNT5.

In addition, the second electrode PE2 of the phototransistors PHT disposed between the (m+1)-th data line DL(m+1) and the (m+2)-th read-out line ROL(m+2) may be connected to the common electrode COM through the fifth contact hole CNT5. Thus, the second electrode may be electrically connected to the (m+1)-th read-out line ROL(m+1) through the common electrode COM.

As described above, since the second electrode PE2 of the phototransistor PHT is electrically connected to the (m+1)-th read-out line ROL(m+1) through the common electrode COM, an increase in the non-open areas can be minimized and the phototransistor PHT can be electrically connected to the read-out line ROL.

In addition, as illustrated in FIG. 9, an increase in the ratio of non-open areas is minimized by distributing the locations of the fourth contact holes CNT4a and CNT4b, through which the phototransistor PHT and the n-th photo-driving line PDL(n) are connected. That is, as the two fourth contact holes CNT4a and CNT4b are disposed on both sides of the data line DL, an increase in the non-open areas due to the arrangement of the phototransistor PHT can be minimized, thereby providing a photosensing function.

Further, since the second electrode PE2 of all of the phototransistors PHT, disposed in the area corresponding to the common electrode COM electrically connected to the (m+1)-th read-out line ROL(m+1), are electrically connected to the (m+1)-th read-out line ROL(m+1), the magnitude of the signal detected through the (m+1)-th read-out line ROL(m+1) due to the photosensing can be increased, thereby improving photosensing performance.

The multi-sensing circuit MSC, performing the touch sensing and the photosensing in the display panel DISP providing such a photosensing function, may be disposed on one or both sides of the display panel DISP depending on the type of the display panel DISP.

In a case in which the multi-sensing circuit MSC is disposed on both sides of the display panel DISP, the structure of the read-out line ROL connected to the multi-sensing circuit MSC needs to be designed differently.

Figure 10:
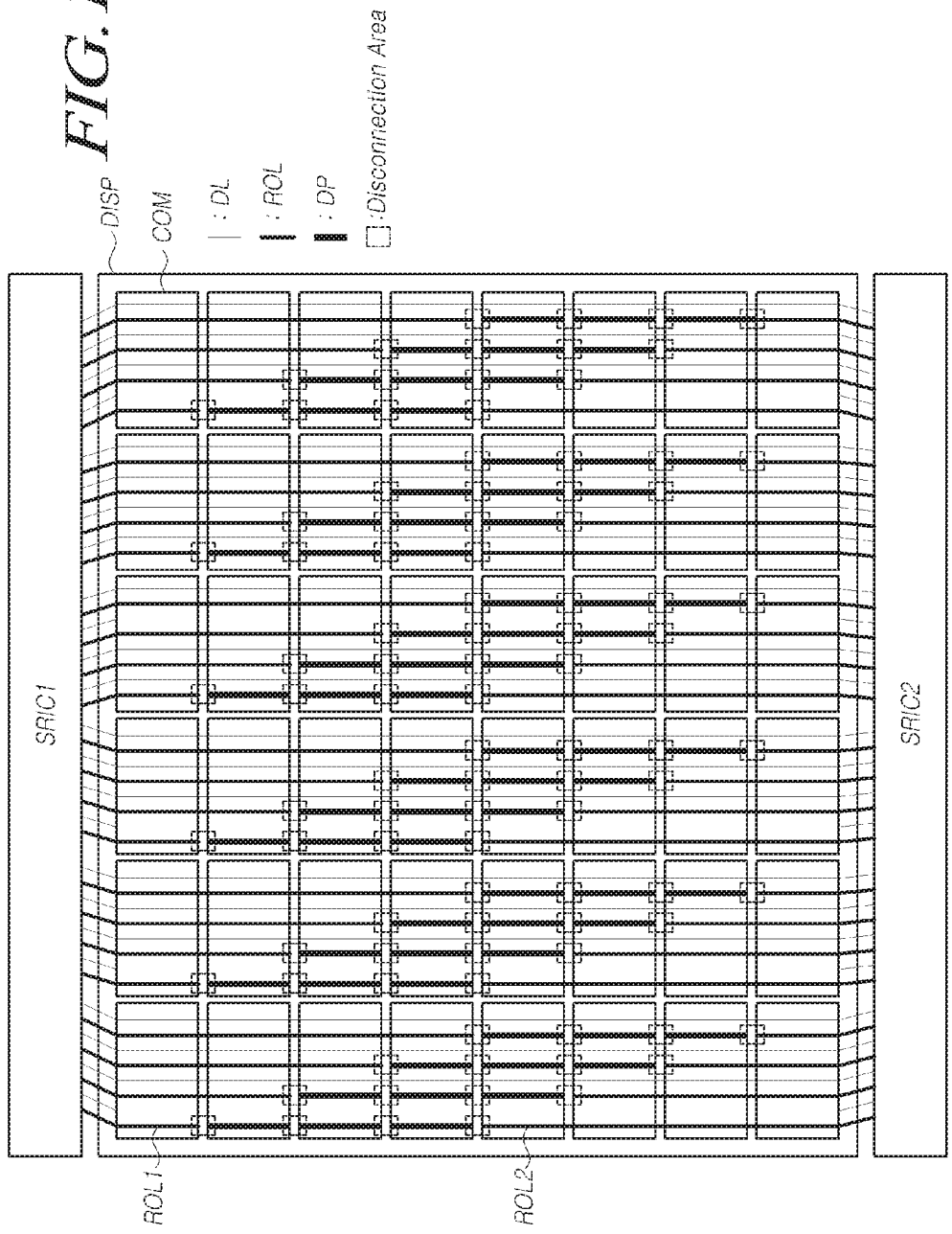
FIG. 10 illustrates a layout of read-out lines disposed in the display panel DISP according to exemplary embodiments.

FIG. 10 illustrates a layout of read-out lines ROL disposed in the display panel DISP according to exemplary embodiments.

Referring to FIG. 10, the multi-sensing circuit MSC is illustrated as being disposed on both sides of the display panel DISP, and is integrated with the data driving circuit DDC, thereby providing an integrated driving circuit SRIC.

Thus, a first integrated driving circuit SRIC1 may be disposed in one portion (for example, an upper portion) of the display panel DISP and a second integrated driving circuit SRIC2 may be disposed in the other portion (for example, a lower portion) of the display panel DISP.

The first integrated driving circuit SRIC1 may be electrically connected to the read-out lines ROL and the data lines DL disposed in the display panel DISP. In addition, the second integrated driving circuit SRIC2 may be electrically connected to the read-out lines ROL and the data lines DL disposed in the display panel DISP.

Here, the data lines DL disposed in the display panel DISP may be connected to the first integrated driving circuit SRIC1 and the second integrated driving circuit SRIC2, respectively. That is, a data signal Vdata may be fed to the data lines DL in a double feeding manner by the first integrated driving circuit SRIC1 and the second integrated driving circuit SRIC2.

The read-out lines ROL disposed in the display panel DISP may include first read-out lines ROL1 connected to the first integrated driving circuit SRIC1, and second read-out lines ROL2 connected to the second integrated driving circuit SRIC2.

That is, each of the first read-out lines ROL1 may be electrically connected between a corresponding common electrode COM among the plurality of common electrodes COM, disposed in the display panel DISP, and the first integrated driving circuit SRIC1. The first integrated driving circuit SRIC1 may drive the first read-out lines ROL1 so as to detect the read-out signal ROS from the common electrodes COM electrically connected to the first read-out lines ROL1.

In addition, each of the second read-out lines ROL2 may be electrically connected between a corresponding common electrode COM, among the plurality of common electrodes COM disposed in the display panel DISP, not connected to the first read-out lines ROL1, and the second integrated driving circuit SRIC2. Thus, the second integrated driving circuit SRIC2 may drive the second read-out lines ROL2 so as to detect the read-out signal ROS from the common electrodes COM electrically connected to the second read-out lines ROL2.

Here, the common electrodes COM electrically connected to the first integrated driving circuit SRIC1 may be referred to as a first group of common electrodes COM, and the common electrodes COM electrically connected to the second integrated driving circuit SRIC2 may be referred to as a second group of common electrodes COM.

Here, the first group of common electrodes COM and the second group of common electrodes COM may include the common electrodes COM disposed on the upper area of the display panel DISP and the common electrodes COM disposed on the lower area of the display panel DISP. That is, the first read-out lines ROL1 may be connected to the common electrodes COM disposed on the upper area of the display panel DISP, and the second read-out lines ROL2 may be connected to the common electrodes COM disposed on the lower area of the display panel DISP.

Thus, the first integrated driving circuit SRIC1 and the second integrated driving circuit SRIC2 may drive the first group of common electrodes COM and the second group of common electrodes COM, respectively.

The first read-out line ROL1 and the second read-out line ROL2 may be separated from each other with at least one dummy pattern DP disposed therebetween.

That is, in a case in which signal lines, such as read-out lines ROL and data lines DL, are disposed in the display panel DISP, each of the read-out lines ROL must be connected to a corresponding common electrode COM while being insulated from the adjacent common electrodes COM. Thus, the read-out lines ROL may be disconnected after being connected to the corresponding common electrodes COM. Accordingly, at least one dummy pattern DP may be provided between the first read-out line ROL1 and the second read-out line ROL2, due to the disconnection of the read-out line ROL.

Since a portion of the read-out line ROL, which is not required to be connected to the common electrode COM, is disconnected as described above, it is possible to prevent an increase in load caused by the overlapping of the read-out line ROL and the other signal lines (e.g., the gate lines GL, the photo-control lines PCL, the photo-driving lines PDL, or the like) in the boundary of the common electrode COM.

Each of the dummy patterns DP, provided due to the disconnection of the read-out lines ROL, may be electrically connected to the common electrode COM located in the area in which the dummy pattern DP is disposed.

That is, since the dummy patterns DP disposed separately from the read-out lines ROL are connected to the corresponding common electrodes COM, the dummy patterns DP may function as the common electrodes COM.

In addition, although the read-out lines ROL may be easily disposed due to the above-described structure, in which the integrated driving circuit SRIC is disposed on both sides of the display panel DISP, areas in which the read-out lines ROL are disconnected may be non-uniformly located, thereby causing the load of the signal lines disposed in the display panel DISP to be non-uniform.

Exemplary embodiments provide a solution of minimizing non-uniform load distribution of the read-out lines ROL caused by the disconnection areas of the read-out lines ROL by modifying the structure of the disconnection areas in which the read-out lines ROL are disconnected or the structure of the read-out lines in the disconnection areas.

Figure 11:
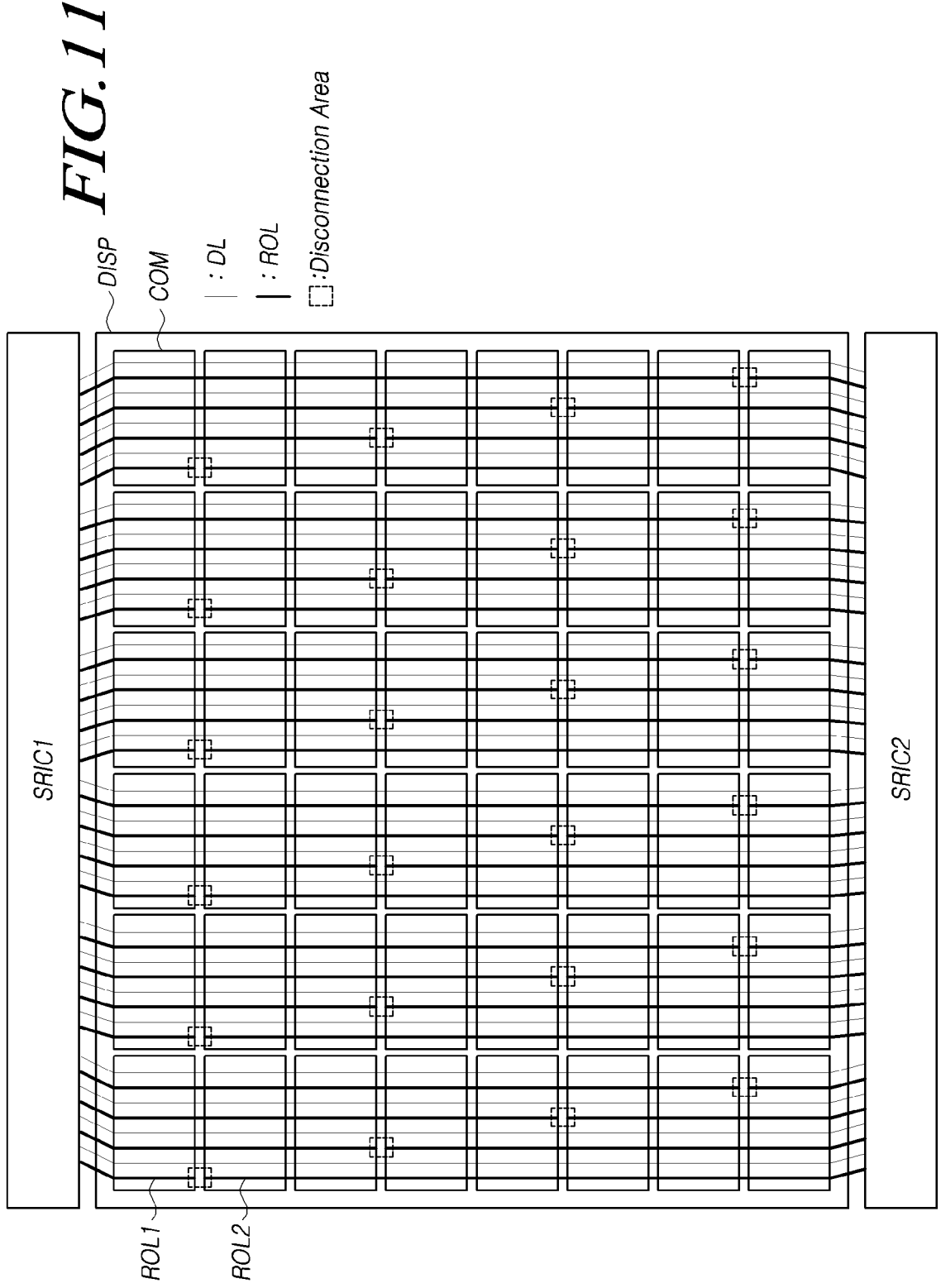
FIG. 11 illustrates another layout of read-out lines disposed in the display panel DISP according to exemplary embodiments.

FIG. 11 illustrates another layout of read-out lines ROL disposed in the display panel DISP according to exemplary embodiments.

Referring to FIG. 11, a first integrated driving circuit SRIC1 and a second integrated driving circuit SRIC2 are disposed on both sides of the display panel DISP.

In addition, the first read-out lines ROL1 are electrically connected between the first group of common electrodes COM, disposed in the display panel DISP, and the first integrated driving circuit SRIC1. The second read-out lines ROL2 may be electrically connected between the second group of common electrodes COM, disposed in the display panel DISP, and the second integrated driving circuit SRIC2.

Here, the first group of common electrodes COM and the second group of common electrodes COM may be alternately disposed in a direction in which the read-out lines ROL extend.

For example, the first read-out lines ROL1 may be electrically connected between the common electrodes COM disposed in the odd-numbered rows and the first integrated driving circuit SRIC1. The second read-out lines ROL2 may be electrically connected between the common electrodes COM disposed in the even-numbered rows and the second integrated driving circuit SRIC2.

That is, in a case in which the signal lines, such as read-out lines ROL, the data lines DL, are provided, the first read-out lines ROL1 and the second read-out lines ROL2 may be disposed such that a single disconnection area is present for each read-out line ROL.

In addition, the common electrodes COM to which the first read-out lines ROL1 are connected and the common electrodes COM to which the second read-out lines ROL2 are connected may be alternately disposed, such that the first read-out lines ROL1 and the second read-out lines ROL2 may be disposed in a manner of minimizing the disconnected areas of the read-out lines ROL.

The common electrodes COM may be connected to the first read-out lines ROL1 and the second read-out lines ROL2 in the same or different manners depending on the column. That is, for example, the common electrodes COM may be disposed in odd rows. In this case, the first read-out lines ROL1 in the first column may be connected to the common electrodes COM in the odd rows, and the first read-out lines ROL1 in the second column may be connected to the common electrodes COM in the even rows.

As described above, only a single disconnection area is present between a pair of corresponding first and second read-out lines ROL1 and ROL2, the disconnection areas can be minimized, thereby minimizing the non-uniform load of the signal lines caused by the non-uniformity of the disconnection areas.

In addition, the disconnection areas may be distributed so as to further reduce the non-uniform load of the signal lines caused by the disconnection areas.

Figure 12:
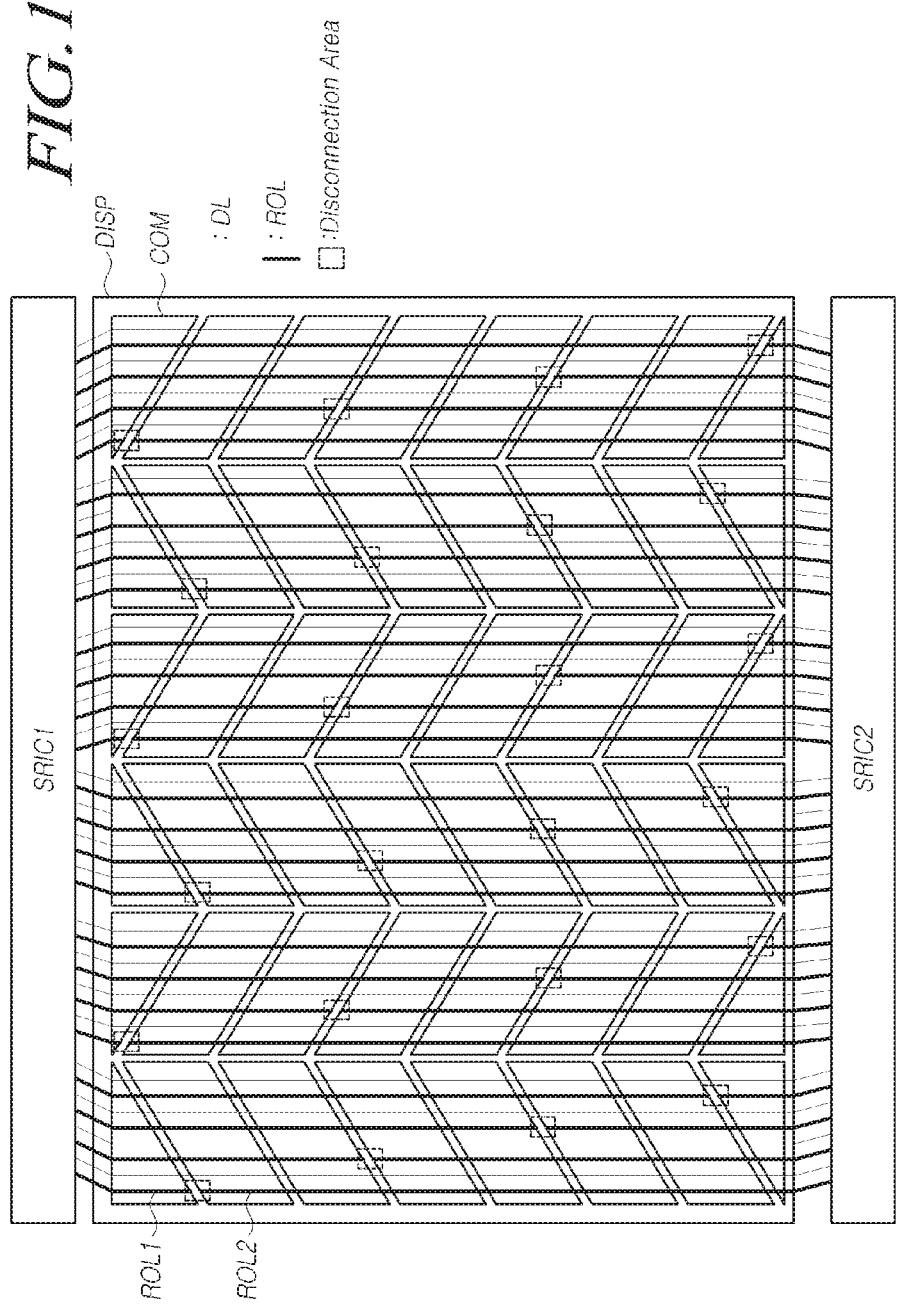
FIG. 12 illustrates another layout of read-out lines disposed in the display panel according to exemplary embodiments.

FIG. 12 illustrates another layout of read-out lines ROL disposed in the display panel DISP according to exemplary embodiments.

Referring to FIG. 12, a first integrated driving circuit SRIC1 and a second integrated driving circuit SRIC2 are disposed on both sides of a display panel DISP. The first read-out lines ROL1 and the second read-out lines ROL2 are disposed to electrically connect the common electrodes COM and the integrated driving circuit SRIC.

Herein, the common electrodes COM connected to the first read-out lines ROL1 and the common electrodes COM connected to the second read-out lines ROL2 may be alternately disposed in a direction in which the read-out lines ROL extend.

Each of the common electrodes COM disposed in the display panel DISP may have a polygonal shape, at least one internal angle of which is not a right angle. That is, the touch blocks defined by the common electrodes COM may have a polygonal structure, such as a triangle, a parallelogram, or the like.

In addition, the common electrodes COM disposed in adjacent columns may be shaped and disposed symmetrically with respect to each other.

Accordingly, this configuration allows only a single disconnection area to be present between a pair of corresponding first and second read-out lines ROL1 and ROL2, such that the read-out lines ROL may be provided in a manner of minimizing the number of the disconnection areas.

In addition, the common electrodes COM may have a shape other than a rectangular shape and may be disposed such that the adjacent columns are symmetrical to each other, such that the disconnection areas of the first read-out lines ROL1 and the second read-out lines ROL2 are not aligned in line.

That is, the disconnection areas of the first read-out lines ROL1 and the second read-out lines ROL2 may be located in at least two lines, in a direction intersecting the read-out lines ROL.

As described above, the disconnection areas of the first read-out lines ROL1 and the second read-out lines ROL2 can be distributed as uniformly as possible so as to minimize the non-uniform load of the signal lines caused by the disconnection areas. It is also possible to prevent an image abnormality caused by non-uniform load of the signal line.

Exemplary embodiments may also prevent non-uniform load caused by the disconnection areas by applying a compensation pattern to the disconnection areas of the first read-out lines ROL1 and the second read-out lines ROL2.

Figure 14:
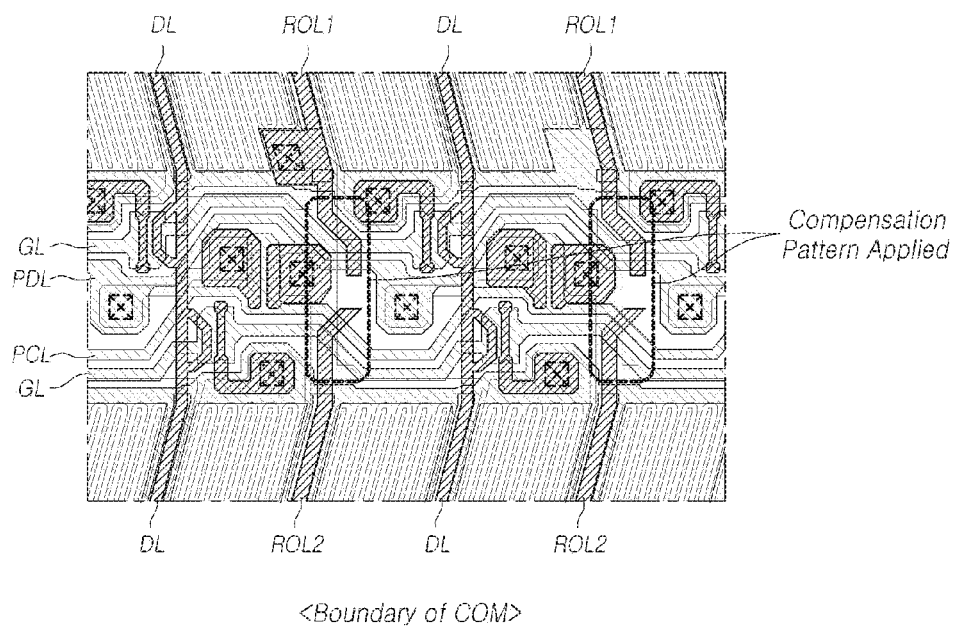

FIGS. 13 and 14 illustrate structures of disconnection areas of read-out lines disposed in the display panel according to exemplary embodiments.

Referring to FIG. 13, overlapping structures of the read-out lines ROL and the signal lines (e.g., gate lines GL, photo-control lines PCL, or photo-driving lines PDL), provided in an internal area and a boundary area of the common electrode COM, are illustrated. In these structures, CASE 1 illustrates a case in which no phototransistors PHT are disposed, while CASE 2 illustrates a case in which phototransistors PHT are disposed.

As illustrated in FIG. 13, in the internal area of a common electrode COM, the read-out lines ROL may overlap the gate lines GL or the like. In contrast, in the boundary area of the common electrode COM, the read-out lines ROL may be disconnected so as not to overlap the gate lines GL or the like.

According to the layout structure of the read-out lines ROL, the non-overlapping portions of the read-out lines ROL and the gate lines GL may be non-uniformly disposed, which may cause an image abnormality due to non-uniform load.

Thus, the non-uniform load due to the disconnection areas of the read-out lines ROL may be prevented by applying a compensation pattern such that the read-out lines ROL disposed in the boundary area of the common electrode COM overlap the gate lines GL in the same pattern as that in the internal area of the common electrode COM.

FIG. 14 illustrates a structure in which a compensation pattern is provided in the boundary area of the common electrode COM in the CASE 2 structure illustrated in FIG. 13.

Referring to FIG. 14, in a boundary area of the common electrode COM, first read-out lines ROL1 may be disposed to be separated from second read-out lines ROL2.

Here, a portion of each of the first read-out lines ROL1 may overlap a gate line GL and a photo-driving line PDL. In addition, a portion of each of the second read-out lines ROL2 may overlap a gate line GL and a photo-control line PCL.

That is, in the boundary area of the common electrode COM, the first read-out lines ROL1 and the second read-out lines ROL2 may be disposed to have the same pattern as that of the read-out lines, in the internal area of the common electrode COM, overlapping the signal lines. This compensation pattern may also be applied to a structure in which the phototransistor PHT is not disposed.

As described above, the first read-out lines ROL1 and the second read-out lines ROL2 have the same areas overlapping the signal lines, such as the gate lines GL, even in the disconnection area. It is thus possible to prevent image abnormalities from being caused by non-uniform load in the disconnection areas.

Further, in exemplary embodiments, the read-out lines ROL driven by the first integrated driving circuit SRIC1 and the second integrated driving circuit SRIC2 may be disposed without the disconnection areas.

Figure 15:
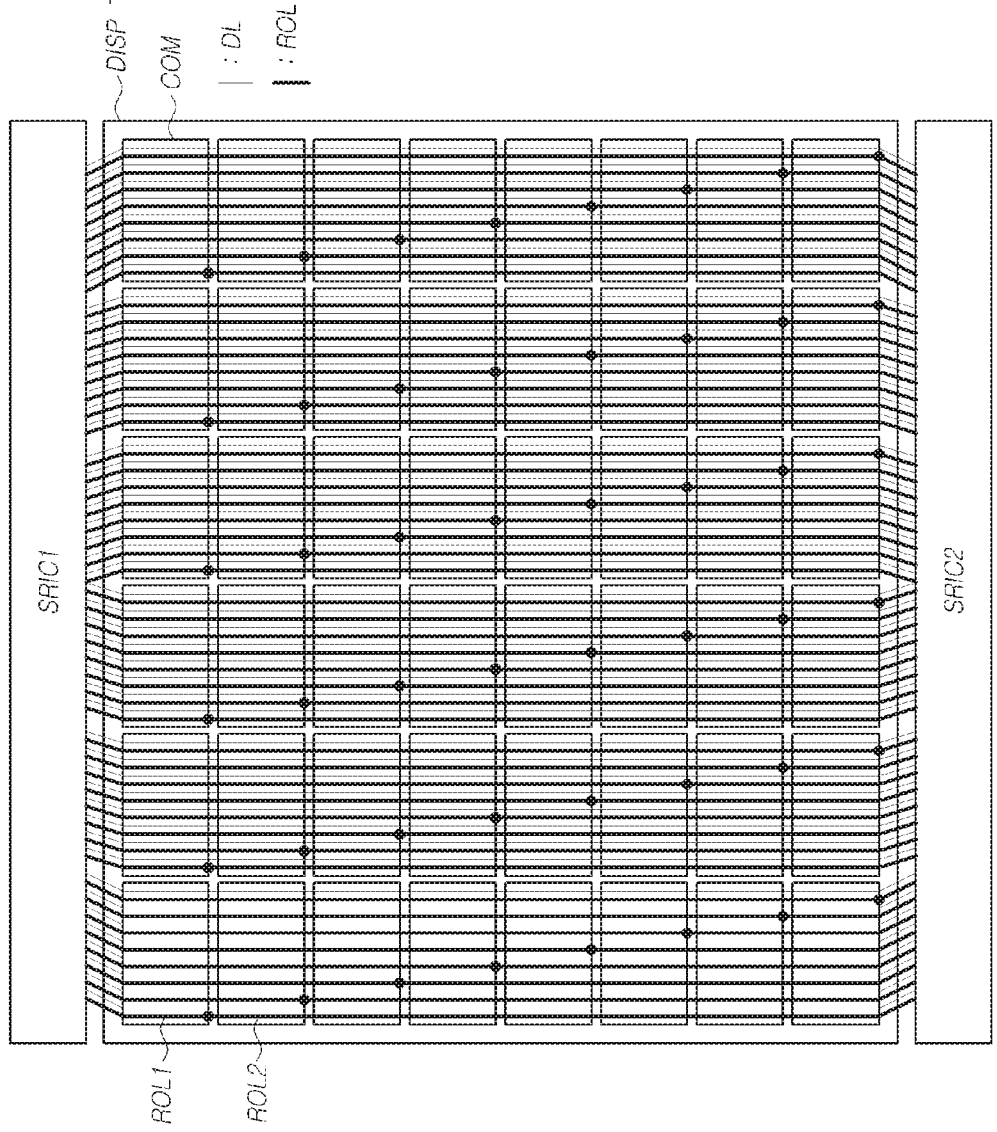
FIG. 15 illustrates another layout of read-out lines disposed in the display panel DISP according to exemplary embodiments.

FIG. 15 illustrates another layout of read-out lines disposed in the display panel DISP according to exemplary embodiments.

Referring to FIG. 15, a first integrated driving circuit SRIC1 and a second integrated driving circuit SRIC2 are disposed on both sides of a display panel DISP. First read-out lines ROL1 electrically connected to the first integrated driving circuit SRIC1 and second read-out lines ROL2 electrically connected to the second integrated driving circuit SRIC2 may be disposed.

Here, the first read-out lines ROL1 and the second read-out lines ROL2 may be electrically connected to the same common electrode COM.

For example, a pair of corresponding first and second read-out lines ROL1 and ROL2 may be integrally provided to electrically connect to a single common electrode COM.

That is, each of the common electrodes COM may be driven by the first integrated driving circuit SRIC1 and the second integrated driving circuit SRIC2. Therefore, the first integrated driving circuit SRIC1 and the second integrated driving circuit SRIC2 may drive the data lines DL and the read-out lines ROL disposed in the display panel DISP.

As described above, each of the first read-out lines ROL1 is provided integrally with the corresponding second read-out line ROL2, such that the first integrated driving circuit SRIC1 and the second integrated driving circuit SRIC2 can drive all of the common electrodes COM. This can prevent the first read-out lines ROL1 and the second read-out lines ROL2 from being disconnected, so that no disconnection areas are provided.

Accordingly, it is possible to prevent an image quality abnormality from being caused by the disconnection areas of the read-out lines ROL caused by the vertical arrangement of the integrated driving circuit SRIC.

The first integrated driving circuit SRIC1 and the second integrated driving circuit SRIC2 may simultaneously drive the same common electrodes COM, but may also drive a common electrode COM selected in consideration of the load difference between the integrated driving circuit SRIC and the common electrodes COM.

Figure 16:
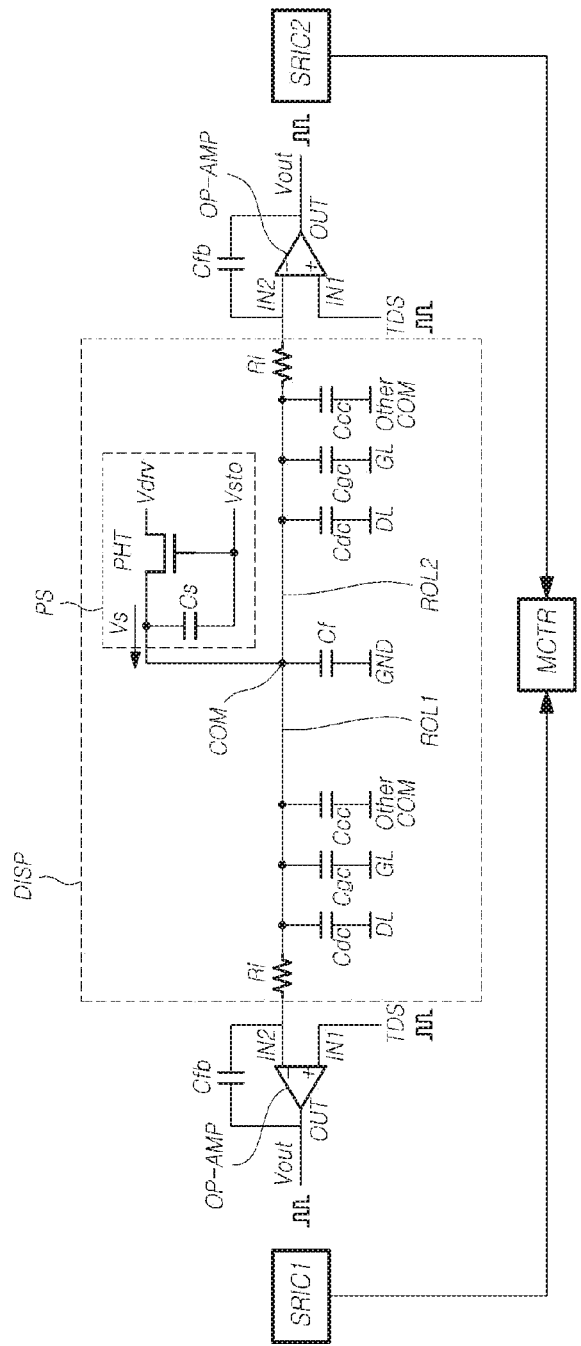
FIG. 16 shows equivalent circuitry that illustrates a method of driving the read-out lines in the layout illustrated in FIG. 15.

FIG. 16 shows equivalent circuitry that illustrates a method of driving the read-out lines in the layout illustrated in FIG. 15.

Referring to FIG. 16, a first integrated driving circuit SRIC1 and a second integrated driving circuit SRIC2 may drive a single common electrode COM through the first and second read-out lines ROL1 and ROL2, respectively.

Here, the first integrated driving circuit SRIC1 and the second integrated driving circuit SRIC2 may simultaneously drive the single common electrode COM. Alternatively, in consideration of the load between the integrated driving circuit SRIC (SRIC1 and SRIC2) and the common electrode COM, only a single integrated driving circuit SRIC1 or SRIC2 may drive the common electrode COM, or, one of the integrated driving circuits SRIC1 and SRIC2 may preferentially drive the common electrode COM.

For example, if the length of the first read-out line ROL1 connected to the common electrode COM is shorter than that of the second read-out line ROL2, the first integrated driving circuit SRIC1 may preferentially drive the common electrode COM.

Alternatively, if the length of the second read-out line ROL2 connected to the common electrode COM is shorter than that of the first read-out line ROL1, the second integrated driving circuit SRIC2 may preferentially drive the common electrode COM.

The driving of the first integrated driving circuit SRIC1 and the second integrated driving circuit SRIC2 may be controlled by a multi-controller MCTR.

Thus, each of the first read-out lines ROL1 is disposed integrally with the corresponding second read-out line ROL2, such that the abnormality of image quality due to the disconnection areas therebetween can be prevented. The touch sensing performance and the photosensing performance using the read-out lines ROL can be improved by controlling the first and second integrated driving circuits SRIC1 and SRIC2, in consideration the load difference.

FIGS. 17 to 20 illustrate various types of light-based input environment provided by the display device according to exemplary embodiments.

The display device according to exemplary embodiments may provide various types of touch-based input environment in which a user can input data or instructions to the device using a finger, a pen, or the like.

Here, various types of touch input may include, for example, a one-tap input in which an input is recognized when the user taps a point one time in a relatively-short period of time, a double-tap input in which an input is recognized when the user taps a point two consecutive times in a relatively-short period of time, a holding touch input (or holding input) in which an input is recognized when the user taps a point in a relatively-long period of time, a dragging input in which the user drags from one point to another point, and the like.

The display device according to exemplary embodiments may provide various types of application processing according to the various types of touch input, depending on the various types of touch input environment provided. The various types of application processing may include, for example, selective processing of selecting an object (e.g., an icon, a button, a text image, a piece of contents, a uniform resource locator (URL) address, a keyboard button, and the like) at a corresponding point on a screen, handwriting or drawing processing, and execution processing of executing an application program or the like linked to a point at which a touch input is performed.

In addition, the display device according to exemplary embodiments may provide various types of light-based input environment equivalent to the various types of touch input environment. In addition, the display device according to exemplary embodiments may provide various types of application processing according to various types of light-based input, in the same manner as in the case of providing the various types of application processing according to the various types of touch input.

The user may illuminate an intended point on the display panel DISP with light by pressing a button of the beam generator BG.

The user may adjust the number of light illuminations by adjusting the number of times that the user presses the button, adjust a period during which light is continuously illuminated by adjusting a period (or holding period) during which the button of the beam generator BG is pressed, e.g., in a relatively-short period of time or a relatively-long period of time, or move a point illuminated with light by moving the beam generator BG while keeping pressing the button of the beam generator BG. As described above, the user may diversify the types of light-based input by manipulating the beam generator BG in various manners.

Accordingly, as the number of times, the period of time, or the like, of the photo response of the phototransistor PHT at the light-illuminated position is changed, the amount of a leakage current (or off-current) flowing through the phototransistor PHT may be changed, the number of times or the period of time of the leakage current (or off-current) continuously flowing through the phototransistor PHT may be changed, or phototransistors PHT responding to light may be changed, thereby changing a pattern of sensing values (e.g., Vout) in the multi-sensing circuit MSC. The multi-controller MCTR can distinguish the types of light-based input by detecting a change in the pattern of sensing values (e.g., Vout) in the multi-sensing circuit MSC.

The multi-sensing circuit MSC of the display device according to exemplary embodiments generates sensing data by detecting a signal Vs, output from the phototransistor PHT that has responded to illumination light, from the common electrode COM as a sensing signal ROS. The multi-controller MCTR may detect light-illuminated coordinates (or photo-coordinates) on the display panel DISP on the basis of the sensing data output from the multi-sensing circuit MSC.

In addition, the multi-controller MCTR may recognize detection time points of the light-based input while detecting the light-illuminated coordinates (or photo-coordinates) on the basis of the sensing data output from the multi-sensing circuit MSC, and calculate a period of time during which the same light-illuminated coordinates (or photo-coordinates) are continuously detected as a continuous detection time CST on the basis of the recognized detection time points and the detected light-illuminated coordinates.

Here, the detection time points may include a detection start time point Ts and a detection complete time point Te. The detection start time point Ts and the detection complete time point Te are points in time at which the continuous detection time CST, during which the same light-illuminated coordinates (or photo-coordinates) are continuously detected, starts and is completed. The continuous detection time CST corresponds to a period of time during which the user has continuously illuminated the same point with light using the beam generator BG.

Hereinafter, various types of light-based input corresponding to the various types of touch input (e.g., one-tap input, double-tap input, or dragging) and methods of recognizing the same will be described.

Figure 17:
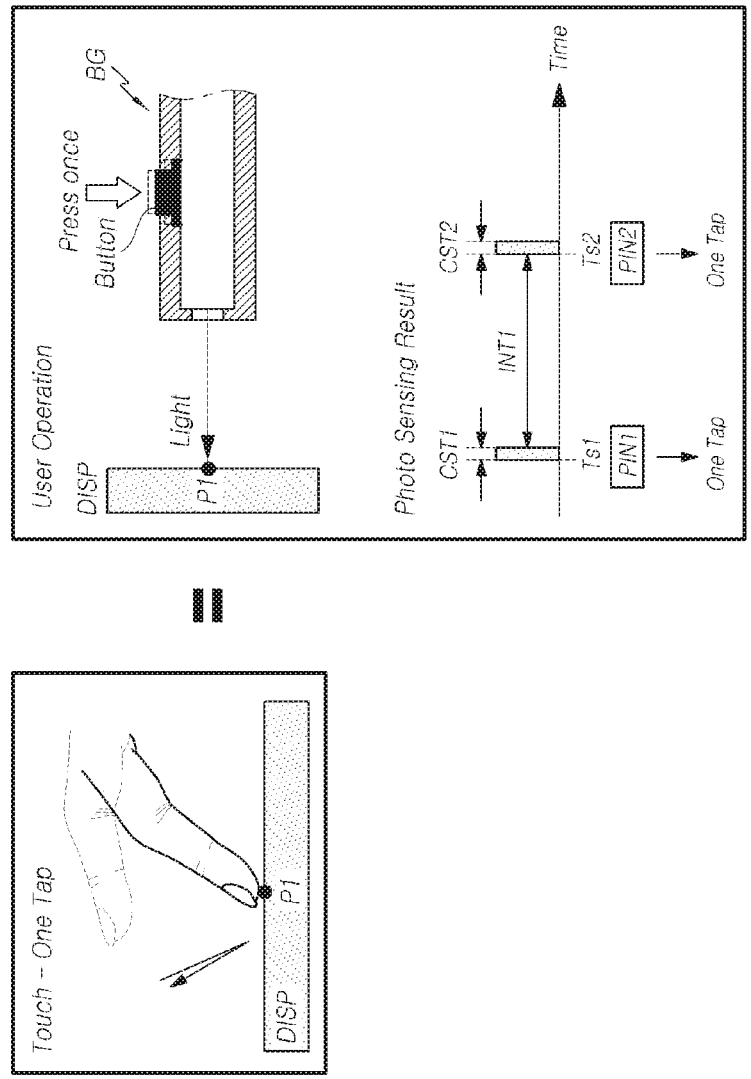
FIGS. 17 to 20 illustrate various types of light-based input environment provided by the display device according to exemplary embodiments.

Referring to FIG. 17, the user may perform a first one-tap-type light-based input PIN1 by performing a light illuminating action of illuminating a point P1 on the display panel DISP with light in a short period of time by pressing the button of the beam generator BG at a point in time Ts1 in a short period of time.

Afterwards, the user may perform a second one-tap-type light-based input PIN2 by performing a light illuminating action of re-illuminating the point P1 on the display panel DISP with light in a short period of time by pressing the button of the beam generator BG in a short period of time once again.

On the basis of the sensing data, the multi-controller MCTR may recognize the first light-based input PIN1 by detecting the point P1 as light-illuminated coordinates at the point in time Ts1 (i.e., start time point), and recognize the second light-based input PIN2 by detecting the point P1 (or another point) as light-illuminated coordinates at the point in time Ts2 after an interval of time INT1 from the point in time Ts1 (i.e., start time point).

In addition to this primary recognition result, in order to distinguish the types of light-based input, the multi-controller MCTR may compare the interval of time INT1 between the point in time Ts1 and the point in time Ts2 with a predetermined threshold interval INT_TH, and compare a continuous detection time CST1 of the first light-based input PIN1 and a continuous detection time CST2 of the second light-based input PIN2 with a threshold continuous detection time CST_TH. In the illustration of FIG. 17, the point in time Ts1 (start time point) and a point in time Te1 (complete time point) of the continuous detection time CST1 of the first light-based input PIN1 are regarded as being substantially the same. In addition, the point in time Ts2 (start time point) and a point in time Te2 (complete time point) of the continuous detection time CST2 of the second light-based input PIN2 are regarded as being substantially the same.

According to the light-illuminating action of the user illustrated in FIG. 17, the interval of time INT1 between the point in time Ts1 and the point in time Ts2 is longer than the threshold interval INT_TH. In addition, each of the continuous detection time CST1 of the first light-based input PIN1 and the continuous detection time CST2 of the second light-based input PIN2 is shorter than the threshold continuous detection time CST_TH.

Accordingly, the multi-controller MCTR recognizes the first light-based input PIN1 and the second light-based input PIN2 as separate one-tap-type light-based inputs, distinguishable from each other.

Figure 18:
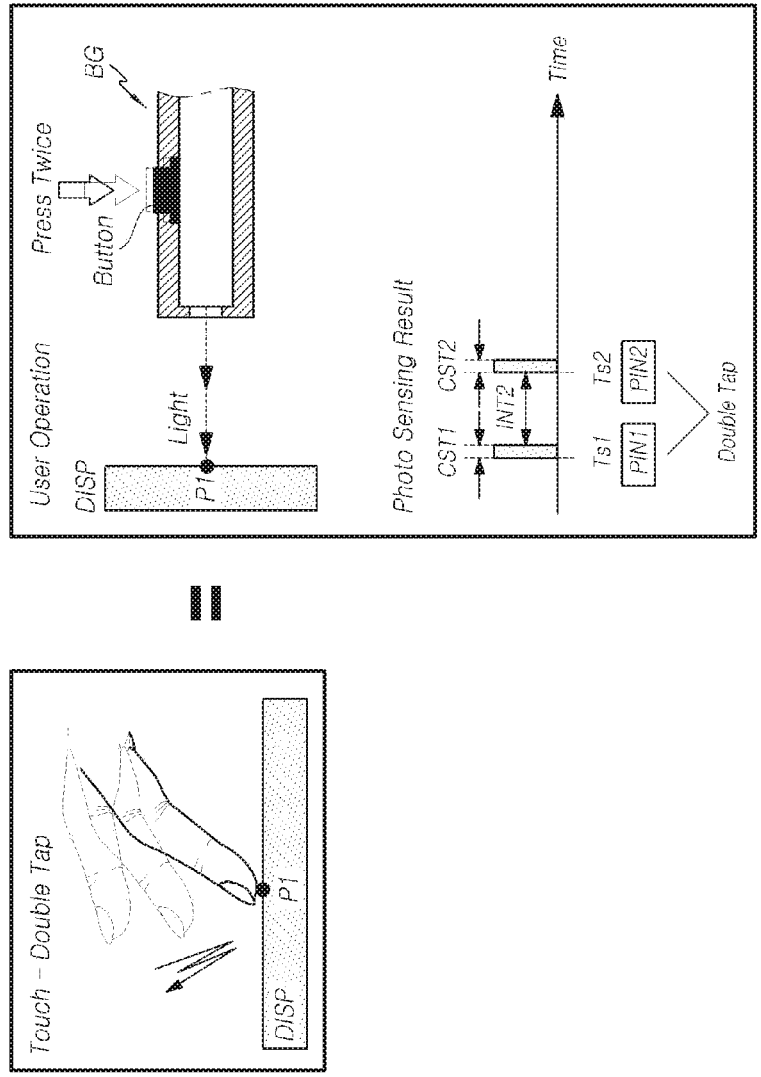

Referring to FIG. 18, the user may perform a double-tap-type light-based input by performing a light-illuminating action of consecutively illuminating a point P1 on the display panel DISP with light in two short periods of time by rapidly pressing the button of the beam generator BG in two short periods of time.

On the basis of the sensing data, the multi-controller MCTR recognizes a first light-based input PIN1 by detecting the point P1 as light-illuminated coordinates at a point in time Ts1, and recognizes a second light-based input PIN2 by detecting the point P1 as light-illuminated coordinates at a point in time Ts2 after a predetermined period of time INT2 from the point in time Ts1.

In addition to this primary recognition result, in order to distinguish the types of light-based input, the multi-controller MCTR compares an interval of time INT2 between the point in time Ts1 and the point in time Ts2 with the predetermined threshold interval INT_TH, and compares a continuous detection time CST1 of the first light-based input PIN1 and a continuous detection time CST2 of the second light-based input PIN2 with the predetermined threshold continuous detection time CST_TH. In the illustration of FIG. 18, a point in time Ts1 (start time point) and a point in time Te1 (complete time point) of the continuous detection time CST1 of the first light-based input PIN1 are regarded as being substantially the same. In addition, a point in time Ts2 (start time point) and a point in time Te2 (complete time point) of the continuous detection time CST2 of the second light-based input PIN2 are regarded as being substantially the same.

According to the light-illuminating action of the user illustrated in FIG. 18, the interval of time INT2 between the point in time Ts1 and the point in time Ts2 is equal to or less than the threshold interval INT_TH. In addition, each of the continuous detection time CST1 of the first light-based input PIN1 and the continuous detection time CST2 of the second light-based input PIN2 is shorter than the threshold continuous detection time CST_TH.

Accordingly, the multi-controller MCTR recognizes both the first light-based input PIN1 and the second light-based input PIN2 as a single light-based input corresponding to the double-tap type light-based input.

Figure 19:
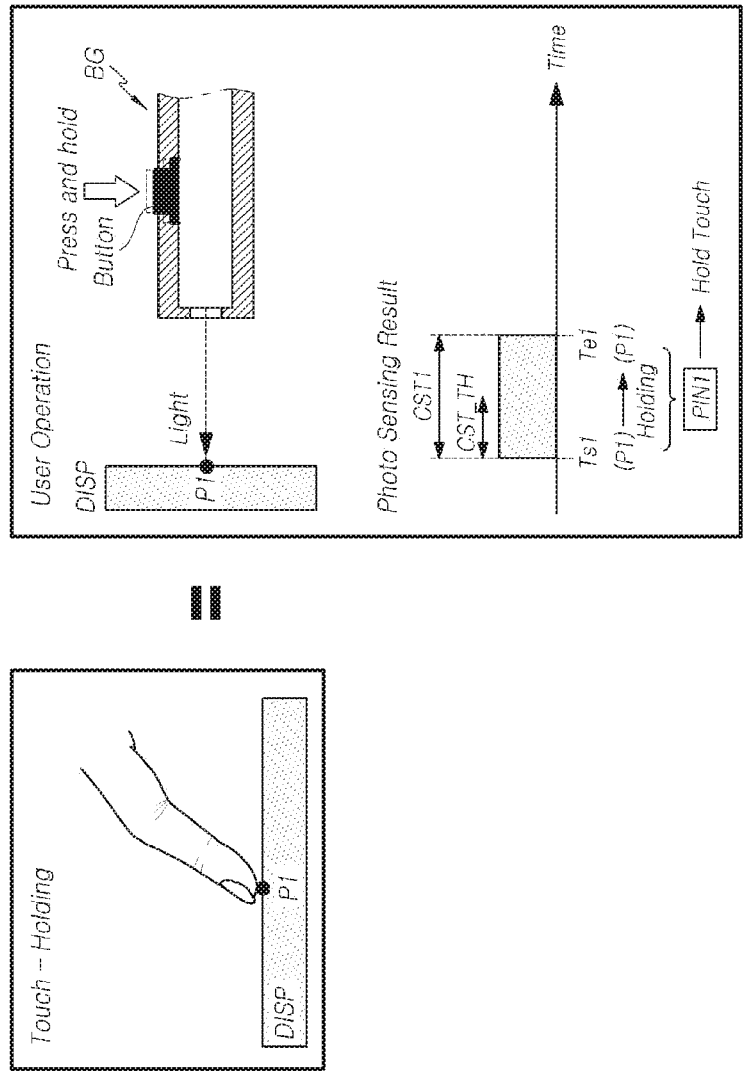

Referring to FIG. 19, the user may perform a holding touch-type light-based input by performing a light-illuminating action of illuminating a point P1 on the display panel DISP with light for a predetermined period of time or more by continuously pressing the button of the beam generator BG in a relatively-long period of time.

On the basis of the sensing data, the multi-controller MCTR recognizes a first light-based input PIN1 by continuously detecting a point P1 as light-illuminated coordinates during a continuous detection time CST1 from a point in time Ts1 to a point in time Te1.

In addition to this primary recognition result, in order to distinguish the types of light-based input, the multi-controller MCTR compares the continuous detection time CST1 of the first light-based input PIN1 with the threshold continuous detection time CST_TH.

According to the light-illuminating action of the user illustrated in FIG. 19, the continuous detection time CST1 of the first light-based input PIN1 is longer than the threshold continuous detection time CST_TH.

Accordingly, the multi-controller MCTR recognizes the first light-based input PIN1 as a holding touch-type light-based input.

Figure 20:
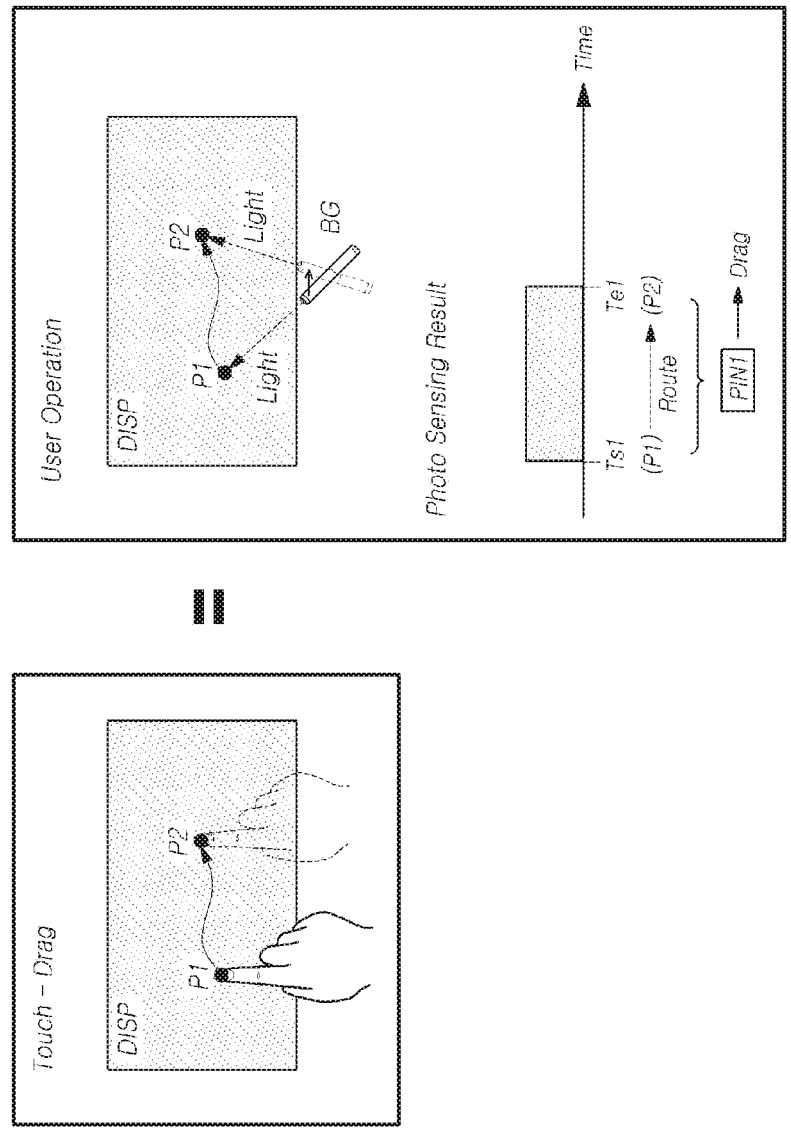

Referring to FIG. 20, the user may perform a dragging light-based input by performing a light-illuminating action of illuminating the display panel DISP with light along a route from a point P1 to a point P2 while continuously pressing the button of the beam generator BG in a relatively-long period of time.

On the basis of the sensing data, the multi-controller MCTR recognizes a first dragging light-based input PIN1 by continuously detecting points on the route from the point P1 to the point P2 as light-illuminated coordinates during a continuous detection time CST1 from a point in time Ts1 to a point in time Te1.

The display device according to exemplary embodiments can provide not only the above-described light-based inputs, such as the one-tap-type input, the double-tap-type input, the holding touch-type input, and the dragging input, but also can provide more various light-based input environments, such as a multi-touch-type light-based input and a multi-dragging light-based input, by modifying or combining the above-described light-based inputs.

As set forth above, according to exemplary embodiments, the output signal Vs of the phototransistor PHT may be detected through the read-out line ROL connected to the common electrode COM serving as a touch sensor, such that the touch sensing and the photosensing can be performed using the shared read-out line ROL.

In addition, all of the phototransistors PHT disposed in the area corresponding to the corresponding common electrode COM may be electrically connected to the read-out line ROL connected to the corresponding common electrode COM, such that the magnitude of the output signals Vs of the phototransistors PHT detected through the read-out line ROL can be increased, thereby improving photosensing performance.

Further, the phototransistor PHT may be connected to the common electrode COM and thus be electrically connected to the read-out line ROL, such that an increase in non-open areas can be minimized, thereby facilitating the electrical connection between the phototransistor PHT and the read-out line ROL.

In addition, in the configuration in which the driving circuit for driving the read-out lines ROL is disposed on both sides of the display panel DISP, no disconnection areas may be provided between the read-out lines ROL driven by the different driving circuits, or the disconnection areas may be distributed, such that abnormalities in image quality due to the disconnection areas of the read-out lines ROL can be prevented, and a sensing function using the shared read-out lines ROL can be provided.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel, comprising:
a plurality of common electrodes disposed in an active area, and included in a first group or a second group;
at least one first driving circuit disposed on a first side of the active area;
at least one second driving circuit disposed on a second side of the active area;
a plurality of first read-out lines electrically connected to the common electrodes in the first group, respectively, and to the first driving circuit; and
a plurality of second read-out lines disposed corresponding to the plurality of first read-out lines, respectively, each second read-out line among the plurality of second read-out lines being disconnected from a corresponding first read-out line among the plurality of first read-out lines, the plurality of second read-out lines being electrically connected to the plurality of common electrodes in the second group, respectively, and to the second driving circuit, the plurality of common electrodes in the first group and the plurality of common electrodes in the second group being alternately disposed in a direction in which the first read-out lines and the second read-out lines extend,
wherein at least one of the plurality of first read-out lines overlaps with at least one of the plurality of common electrodes in the second group, and
wherein at least one of the plurality of second read-out lines overlaps with at least one of the plurality of common electrodes in the first group.

2. The display panel according to claim 1, wherein boundary areas between the first read-out lines and the second read-out lines are located on two or more straight lines intersecting the direction in which the first read-out lines and the second read-out lines extend.

3. The display panel according to claim 1, wherein one or more areas among a plurality of areas corresponding to the plurality of common electrodes, respectively, have a polygonal shape, at least one internal angle of the polygonal not being a right angle.

4. The display panel according to claim 3, wherein common electrodes among the plurality of common electrodes, disposed in adjacent columns, are disposed symmetrically with respect to each other.

5. The display panel according to claim 1, wherein at least one of the plurality of first read-out lines or the plurality of second read-out lines overlaps at least one signal line in an internal area and a boundary area of a corresponding common electrode among the plurality of common electrodes, the at least one signal line extending in a direction that intersects the direction in which the plurality of first read-out lines and the plurality of second read-out lines extend.

6. The display panel according to claim 5, wherein a first read-out line among the plurality of first read-out lines and a second read-out line among the plurality of second read-out lines overlap the at least one signal line in boundary areas of the first read-out line and the second read-out line in a pattern that is the same as a pattern in which the at least one of the plurality of first read-out lines or the plurality of second read-out lines overlaps the at least one signal line in the internal area of the common electrode.

7. A display device, comprising: a display panel including a first common electrode group having a plurality of common electrodes disposed in an active area and a second common electrode group having a plurality of common electrodes disposed in the active area; a first driving circuit electrically connected to the plurality of common electrodes of the first common electrode group; and a second driving circuit electrically connected to the plurality of common electrodes of the second common electrode group; wherein the first common electrode group includes a first common electrode and the second common electrode group includes a second common electrode, wherein the first common electrode of the first common electrode group is electrically connected to the first driving circuit via a first read-out line, line wherein the second common electrode of the second common electrode group electrically connected to the second driving circuit via a second read-out line and the second common electrode is disposed between the first common electrode and the second driving circuit, wherein the first read-out line and the second read-out line are extended along a first direction in the active area;
and wherein at least one of the plurality of first read-out lines overlaps with at least one of the plurality of common electrodes in the second group, and
wherein at least one of the plurality of second read-out lines overlaps with at least one of the plurality of common electrodes in the first group, and a length of the first read-out line is shorter than a length of the second read-out line.

8. The display device of claim 7, wherein an end portion of the first read-out line and an end portion of the second read-out line are disposed between the first common electrode and the second common electrode.

9. The display device of claim 7, wherein a distance between a one side edge of the first common electrode and the first read-out line is the same as a distance between a one side edge of the second common electrode and the second read-out line.

10. The display device of claim 7, wherein the display panel further includes a main photo-driving line and a main photo-control line,
wherein the main photo-driving line and the main photo-control line are disposed in a non-active area of the display panel.

11. The display device of claim 10, wherein the display panel further includes a first dummy subpixel and a second dummy subpixel in the non-active area of the display panel,
wherein the first dummy subpixel and the second dummy subpixel are disposed between the main photo-driving line and the main photo-control line.

12. The display device of claim 11, wherein the display panel further includes a first photo-driving line and a first photo-control line,
wherein the first photo-driving line is electrically connected to the main photo-driving line and extends along a second direction,
wherein the first photo-control line is electrically connected to the main photo-control line and extends along the second direction,
wherein the first photo-driving line and the first photo-control line are disposed between the first dummy subpixel and the second dummy subpixel.

13. The display device of claim 7, wherein the first driving circuit and the second driving circuit are configured to simultaneously output the touch driving signal.

14. The display device of claim 7, wherein the display panel further comprises a plurality of phototransistors, two or more phototransistors among the plurality of phototransistors being in an area corresponding to the first common electrode, and
wherein the two or more phototransistors in the area corresponding to the first common electrode are electrically connected to the first read-out line which is electrically connected to the first common electrode.

15. The display device of claim 14, wherein, in at least a portion of a period during which a touch driving signal is applied to the first common electrode, a photo-control signal corresponding to the touch driving signal is applied to a gate electrode of at least one phototransistor among the plurality of phototransistors.

16. The display device of claim 15, wherein the photo-control signal has a phase and an amplitude the same as a phase and an amplitude of the touch driving signal, respectively, and has a voltage level different from a voltage level of the touch driving signal, wherein the phototransistor is turned off by the voltage level of the photo-control signal.

17. The display device of claim 5, wherein the at least one signal line is one of a plurality of gate lines for display driving, one of a plurality of photo-control lines or one of a plurality of photo-driving lines.

18. The display device of claim 7, wherein the display panel further including a first data line, wherein the first data line overlaps with the first common electrode and the second common electrode,
wherein a distance between the first data line and the first read-out line is the same as a distance between the first data line and the second read-out line.

19. A display device, comprising:
a display panel including:
an active area including a first area and a second area, the first area and the second area being arranged along a first direction;
a first common electrode group disposed in the first area, the first common electrode group including a first common electrode; and
a second common electrode group disposed in the second area, the second common electrode group including a second common electrode;
a read-out line overlapping the first common electrode and the second common electrode, the read-out line including:
a first portion extending in the first direction and overlapping the first common electrode; and
a second portion extending in the first direction and overlapping the second common electrode, the second portion being isolated from the first portion by a disconnection area;
a first driving circuit on a first side of the display panel, the first side being nearer to the first area than to the second area, the first driving circuit being electrically connected to the first common electrode group, the first common electrode being electrically connected to the first driving circuit via the first portion; and
a second driving circuit on a second side of the display, the second side being nearer to the second area than to the first area, the second driving circuit being electrically connected to the second common electrode group, the second common electrode being electrically connected to the second driving circuit via the second portion.

* * * * *